US008583977B2

(12) United States Patent
Munson et al.

(10) Patent No.: US 8,583,977 B2
(45) Date of Patent: *Nov. 12, 2013

(54) METHOD AND SYSTEM FOR RELIABLE DATA TRANSFER

(75) Inventors: Michelle Christine Munson, Oakland, CA (US); Serban Simu, Oakland, CA (US)

(73) Assignee: Aspera, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,404

(22) Filed: Jul. 2, 2012

(65) Prior Publication Data

US 2012/0272115 A1 Oct. 25, 2012

Related U.S. Application Data

(63) Continuation of application No. 11/768,336, filed on Jun. 26, 2007, now Pat. No. 8,214,707.

(51) Int. Cl.
*H04L 1/18* (2006.01)

(52) U.S. Cl.
USPC .......................................... 714/748; 370/394

(58) Field of Classification Search
USPC ............ 370/428, 394; 714/748, 749; 709/228
See application file for complete search history.

(56) References Cited

U.S. PATENT DOCUMENTS

| 4,422,171 | A | * | 12/1983 | Wortley et al. | ............... | 714/748 |
|---|---|---|---|---|---|---|
| 5,001,628 | A | * | 3/1991 | Johnson et al. | ........................ | 1/1 |
| 5,805,920 | A | * | 9/1998 | Sprenkle et al. | ................... | 710/1 |
| 6,078,564 | A | * | 6/2000 | Lakshman et al. | ............ | 370/235 |
| 6,110,382 | A | * | 8/2000 | Wiemers et al. | ............... | 210/709 |
| 6,404,739 | B1 | * | 6/2002 | Gonno | .......................... | 370/236 |
| 7,496,330 | B2 | * | 2/2009 | Toyoda et al. | .............. | 455/67.16 |
| 7,765,307 | B1 | * | 7/2010 | Kritov et al. | ................... | 709/228 |
| 7,965,729 | B2 | * | 6/2011 | Veeraraghavan et al. | ..... | 370/428 |
| 8,085,781 | B2 | * | 12/2011 | Munson et al. | ............... | 370/394 |
| 2002/0044528 | A1 | * | 4/2002 | Pogrebinsky et al. | ........ | 370/230 |
| 2003/0012212 | A1 | * | 1/2003 | Earnshaw et al. | ............. | 370/428 |
| 2003/0032391 | A1 | * | 2/2003 | Schweinhart et al. | ....... | 455/12.1 |
| 2003/0223430 | A1 | * | 12/2003 | Lodha et al. | ............. | 370/395.41 |
| 2003/0231661 | A1 | * | 12/2003 | DePietro et al. | .............. | 370/474 |

(Continued)

OTHER PUBLICATIONS

"Advanced Network Management Lab—Tsunami", http://anml.iu.edu/research.shtml?prim=lab_researc, (2005).

(Continued)

*Primary Examiner* — David Ton
(74) *Attorney, Agent, or Firm* — Schwegman, Lundberg & Woessner, P.A.

(57) ABSTRACT

This disclosure relates to network data communication. Some embodiments include initiating a network connection between an original source and an ultimate destination, transmitting a block of data from the original source to the ultimate destination on the network, requesting retransmission of lost blocks from the ultimate destination to the source and retransmitting the lost blocks from source to the ultimate destination. These embodiments further include measuring round-trip time of a retransmit request, the round-trip time measured from a time of transmission of a retransmit request from the ultimate destination to a time of reception at the ultimate destination after retransmission from the original source and setting the round-trip time as a minimum retransmission request time for the network connection, wherein the round-trip time includes latencies of the network connection and in data processes at the original source and at the ultimate destination.

20 Claims, 7 Drawing Sheets

(56) References Cited

U.S. PATENT DOCUMENTS

| | | | |
|---|---|---|---|
| 2004/0179477 A1* | 9/2004 | Lincoln et al. | 370/241 |
| 2005/0018617 A1* | 1/2005 | Jin et al. | 370/252 |
| 2006/0159098 A1* | 7/2006 | Munson et al. | 370/394 |

OTHER PUBLICATIONS

"Aspera Technology: "The Aspera FASP Solution"", www.asperasoft.com/technology-fasp.htm, (May 1, 2004), 1-4.

"HyperIP", http://www.netex.com/products/hyperip.html, (2006).

"Orbital Data 5500 product", Product Data Sheet, http://www.orbitaldata.com/pdf/Orbital_5500.pdf#search=%22Orbital%20Data%205500%20%22, (2004), 2 pages.

"The Aspera FASP Solution", Aspera Technology, URL, http://web.archive.org/web/20041015013735/www.asperasoft.com/technology fasp.html, (Oct. 15, 2004), 1-4.

Byers, J. W., et al., "A digital fountain approach to reliable distribution of bulk data", ACM SIGCOMM Computer Communication Review, 28(4), (1998), 56-67.

Clark, D. D., et al., "NETBLT: A Bulk data transfer protocol", Network Working Group Request for Comments, RFC 998, (Mar. 1987), 21 pages.

Dunigan, Tom, "Faster Bulk Transfer Starring UDP", http://www.csm.ornl.gov/~dunigan/net100/udp/, (Sep. 2003).

Floyd, Sally, et al., "Equation-based congestion control for unicast applications", Proc. ACM SIGCOMM, (Sep. 2000), 43-56.

Floyd, Sally, "HighSpeed TCP for Large Congestion Windows", RFC 3649, Experimental, http://www.icir.org/floyd/hstcp.html, (Dec. 2003), 25 pages.

Grieco, Luigi A., et al., "Performance evaluation and comparison of Westwood+, New Reno, and Vegas TCP congestion control", ACM SIGCOMM Computer Communication Review, 34(2), (2004), 25-38.

Gu, Y., et al., "Experiences in Design and Implementation of a High Performance Transport Protocol", Proceedings of the 2004 ACM/IEEE conference on Supercomputing, (2004), 14 pages.

Gu, Y., et al., "UDT: A transport protocol for Data intensive applications", Internet Engineering Task Force, Internet Draft, IETF Standard-Working-Draft, (Aug. 2004).

Handley, M, et al., "TCP Friendly Rate Control (TFRC): Protocol Specification", IETF, (Jan. 2003), 1-24.

Handley, S. F, et al., "Friendly rate control (TFRC): protocol specifications", [Online]. Retrieved from the Internet: <URL: http://citeseer.ist.psu.edu/handley03tcp.html>, (2001).

He, E., et al., "Reliable Blast UDP: Predictable High Performance Bulk Data Transfer", Proceedings of the IEEE International Conference on Cluster Computing., (Sep. 23-26, 2002), 317-324.

He, E., et al., "Reliable Blast UDP: Predictable High Performance Bulk Data Transfer", Proceedings of the IEEE International Conference on Cluster Computing (CLUSTER'02), (2002), 317-324.

Jacobson, V., et al., "Congestion Avoidance and Control", In: Proceedings of the Sigcomm '88 Symposium, (Nov. 1988), 1-25.

Jin, Cheng, et al., "FAST TCP", 57th IETF Meeting, Transport Area WG, Vienna, Austria, Available from http://netlab.caltech.edu/FAST/, (Jul. 18, 2003), 73 pages.

Jin, Cheng, et al., "FAST TCP for high-speed long-distance networks", http://netlab.caltech.edu/pub/papers/draft-jwl-tcp-fast-01.txt, (Jun. 30, 2003), 8 pages.

Jin, Cheng, et al., "FAST TCP: Motivation, Architecture, Algorithms, Performance", Presentation for Infocom 2004, available at http://netlab.caltech.edu/FAST/, (2004), 31.

Jin, Cheng, et al., "FAST TCP: Motivation, Architecture, Algorithms, Performance", Proceedings of IEEE INFOCOM, (Mar. 2004), 12 pgs.

Jin, Cheng, et al., "FAST TCP: Motivation, Architecture, Algorithms, Performance", Caltech CS Technical Report, available at http://netlab.caltech.edu/FAST/, (Aug. 2, 2004), 44 pages.

Kelly, T., "Scalable TCP: improving performance in highspeed wide area networks", ACM SIGCOMM Computer Communication Review, 33(2), (2003), 83-91.

Lakshman, T. V., et al., "The performance of TCP/IP for networks with high bandwidth-delay products and random loss", IEEE/ACM Transactions on Networking, 5(3), (Jun. 1997), 336-350.

Liebeherr, J., et al., "A Protocol for Relative Quality-of-Service in TCP/IP-based Internetworks", Proceedings of 3rd IEEE Workshop on the Architecture and Implementation of High Performance Communication Subsystems (HPCS'95), (Aug. 23, 1995), 62-65.

Liebeherr, J., et al., "A Protocol for Relative Quality-of-Service in TCP/IP-based Internetworks", 3rd IEEE workshop on the architecture and implementation of high performance communication sybsystems (HPCS'95), IEEE, (Aug. 23, 1995), 62-65.

Mark, R M, "Tsunami: A High-Speed Rate-Controlled Protocol for File Transfer", URL, http://steinbeckucs.indiana.edu/{mmeiss/papers/tsunami.pdf, (2003), 1-10.

Mathis, M., et al., "The macroscopic behavior of the TCP congestion avoidance algorithm", ACM SIGCOMM Computer Communication Review, 27(3), (1997), 67-82.

Maymounkov, P., et al., "Rateless Codes and Big Downloads", Proc. of the 2nd International Workshop on Peer-to-Peer Syst, (2003), 6 pages.

Meiss, M. R, "Tsunami: A High-Speed Rate-Controlled Protocol for File Transfer", http://steinbeck.ucs.indiana.edu/~mmeiss/papers/tsunami.pdf, (2003), 1-10.

Postel, J., et al., "File Transfer Protocol (FTP)", IETF RFC 959, (Oct. 1985), 69 pgs.

Ryan, X, et al., "GTP: Group Transport for Lambda-Grids", CCGRID 2004, IEEE, (Apr. 19, 2004), 228-238.

Wu, R. X, et al., "GTP: Group transport Protocol for lambda-grids", IEEE Symposium on Cluster Computing and the Grid (CCGrid), (Apr. 19, 2004), 228-238.

Xu, L., et al., "Binary Increase Congestion Control (BIC) for Fast Long-Distance Networks", Proceedings of IEEE INFOCOM, (2004), 11 pgs.

Yunhong, G., et al., "UDT: A Transport Protocol for Data Intensive Applications", IETF, N1, (Aug. 2004), 1-16.

Yunhong, G., "A Transport Protocol for Data Intensive Applications draft", IETF Standard-Working-Draft, Internet Engineering Task Force, (2004).

* cited by examiner

METHOD AND SYSTEM FOR RELIABLE DATA TRANSFER

RELATED APPLICATIONS

This application is a continuation of U.S. patent application Ser. No. 11/768,336 (issuing as U.S. Pat. No. 8,214,707 on Jul. 3, 2012), filed Jun. 26, 2007, which is incorporated herein by reference in its entirety.

This application claims the benefit under 35 U.S.C. Section 120, of U.S. application Ser. No. 11/317,663, filed on Dec. 23, 2005, and is incorporated herein by reference in its entirety.

This application is related to PCT/US2005/047076, filed Dec. 23, 2005 and published on Jul. 6, 2006 as WO 2006/071866. The entire specification is incorporated by reference herein.

This application is related to U.S. Provisional Patent Application 60/638,806 filed Dec. 24, 2004, U.S. Provisional Application Ser. No. 60/649,198, filed Feb. 1, 2005, and U.S. Provisional Application Ser. No. 60/649,197, filed on Feb. 1, 2005. The entire specifications of which are incorporated by reference herein.

FIELD

The present inventive subject matter relates to network data communication, and more particularly to a bulk data transfer protocol.

BACKGROUND

With recent increases in network bandwidth, the ubiquitous interconnectedness of users through the global Internet, and the increasing volume of digital data processed by business and consumer users, the demands for network-based transfer of bulk data (files and directories) are ever growing. In particular, users desire to transfer larger files, over networks of ever higher bandwidths, and at ever longer distances.

Such data transfer paths not only experience high bottleneck bandwidths and round-trip delays due to geographical distance, but they also experience periods of packet losses, and variable delays due to the media itself (e.g. wireless), and to variable and sometimes excessive, traffic congestion.

Conventional bulk data transfer protocols based on the Transmission Control Protocol (TCP) suffer from severe performance limitations over typical global Internet paths, due to the poor performance of TCP over networks with high bandwidth-delay products. Much attention has focused on implementations and alternative transport protocols for improving performance (transfer speed and bandwidth utilization) for bulk data transfer on high-bandwidth, high-delay networks. However, current approaches offer improved throughputs and bandwidth utilization primarily on links in the Internet core, which have relatively low bit error rates (BER) and have an abundance of bandwidth, avoiding traffic congestion. However, the majority of user data transfers span the network edge-to-edge, and not only experience high round-trip delays due to geographical distance, but also experience periods of packet losses and variable delay characteristic of the typical "edge" network. On typical edge networks, current approaches fail to achieve full bandwidth utilization, suffer from variable throughputs as congestion increases, and can not provide sufficient guarantees on transfer times required by time-critical business processes and demanding consumer users. Furthermore, in the limited cases where current approaches do improve throughput, they do so at the expense of fair sharing of bandwidth with other network applications, and provide the end user no control over the bandwidth sharing. The end user is forced to choose between a poorly performing but "fair" standard TCP implementation, or an alternative new protocol that provides improved throughput in limited cases but at the expense of bandwidth fairness. While this may be acceptable in the Internet core, it is not acceptable on the often over-subscribed edge networks where data transfers are admitted to networks with limited available bandwidth. There is a need in the art for a system for data transfer that addresses the foregoing concerns and provides improved throughput, predictable transfer speeds independent of the network distance or congestion (and associated delays and packet losses), automatic full utilization of bandwidth, and the ability to share bandwidth proportionally with other traffic when no bandwidth is unused, taking into account both current and future implementations of the TCP protocol.

SUMMARY

The above-mentioned problems and others not expressly discussed herein are addressed by the present subject matter and will be understood by reading and studying this specification.

The present subject matter provides a reliable network data transfer system. The system is useful for transferring data over networks and providing improvements to data transfer rates over networks using software data transfer applications.

Some embodiments of the system provide an application-level (user space as opposed to kernel-space) bulk data transport protocol that yields high bulk data transfer speeds over commodity networks (of any bandwidth, delay, and loss rate) with sufficient transmission efficiency to allow for independent transfer rate control. As a result, the system provides applications exhaustive, configurable, real-time control of transfer rates over the universal commodity network while remaining stable and predictable.

Some embodiments of the system are targeted to data transfer for the large and growing universe of commodity edge networks. Some embodiments also provide a high degree of control and transparency for single stream data transfers utilizing commodity networks. More specifically, as a direct outgrowth of its transmission efficiency and stability independent of network delay and packet loss, these embodiments of the system are able to decouple its reliability algorithm from its rate control, and provides accurate, exhaustive, real-time control of the transfer rate to the application, independent of the network conditions. This includes pre-set and real-time control of the absolute transfer rate for predictable transfer times, and control of the bandwidth usage of the system in relation to other traffic on a shared link such as one-for-one fairness with TCP flows (both standard TCP and emerging new TCP implementations). Conversely, some embodiments provide real-time visibility into the transfer performance and dynamic network parameters.

Further embodiments also provide a generalized, bulk data transfer service with a programmatic interface appropriate for applications requiring operating system and file system independent transfer. The service layer of these embodiments provides for embedded use on a variety of computing devices, as a background service running in conjunction with other applications, and not requiring a dedicated computer system. In addition to data transfer, the service layer offers generic application capabilities required by modern commercial applications including security (authentication and encryption), automatically resumed transfers from the same or alternative server(s), automatic restart in case of network outage or network roaming (e.g. cellular to fixed wireless), and activation from file reference such as URL links.

Some embodiments of the system provide a highly efficient reliability mechanism that ensures a useful throughput equal to the injection rate less the packet loss rate on the transfer path. Embodiments including the mechanism prevent duplicate data transmission (in the presence of variable network delays and non-negligible packet loss rates) typical of previous reliable UDP transports. Some embodiments also include injection rate control independent of the reliability mechanism. The reliability mechanism ensures high efficiency independent of network conditions and thus does not require a separate flow control to prevent the protocol from performance degradation resulting in low useful throughput, sometimes called "congestion collapse." Yet further embodiments include equation-based rate control enabling fast convergence to a target transfer rate and stable throughput at equilibrium. In some such embodiments, the system detects congestion using network queuing delay in an application-level protocol to accurately distinguish network congestion from packet loss due to random errors (BER). Yet other embodiments provide the system the ability to set a target transfer rate before and during a transfer. The rate can be fixed, or dynamically adaptive with a configurable aggressiveness in relation to standard TCP, or new emerging TCP or other transport implementations, or dynamically adaptive according to a prioritization policy.

These elements, and others, of the system are embodied in a programmatic management interface for applications, which provides exhaustive control and monitoring of system transfers. Other embodiments include standalone applications, operating system plug-ins, utility applications, hardware components, and virtually any other type of software or hardware arrangement capable of providing the services of the systems described herein.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

BRIEF DESCRIPTION OF THE DRAWINGS

The attached figures are provided to demonstrate some aspects and examples related to the present system, but are not intended to be exclusive or exhaustive representations of the present subject matter.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. The following description is, therefore, not to be taken in a limited sense, and the scope of the inventive subject matter is defined by the appended claims and their legal equivalents.

It is understood that the system provided herein may be realized using hardware, software, firmware and combinations of hardware and/or software and/or firmware in different embodiments. It is understood that in various embodiments, functions of the system may correspond to modules, which are implemented in software, hardware, firmware, or any combination thereof. The examples provided herein may combine one or more functions per module, however, it is contemplated that other combinations of functions can be realized without departing from the scope of the present subject matter.

In various embodiments, the software portions may be executed using devices including, but not limited to, a digital signal processor, ASIC, microprocessor, microcontroller, or other type of processor. The environments in which the present subject matter may be practiced in include, but are not limited to, computing environments with network devices, such as computers, servers, routers, gateways, LANs, WANs, intranet and/or INTERNET pathways or other network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

This application is related to U.S. Provisional Patent Application 60/638,806 filed Dec. 24, 2004, the entire specification of which is incorporated by reference herein.

Figure 1:
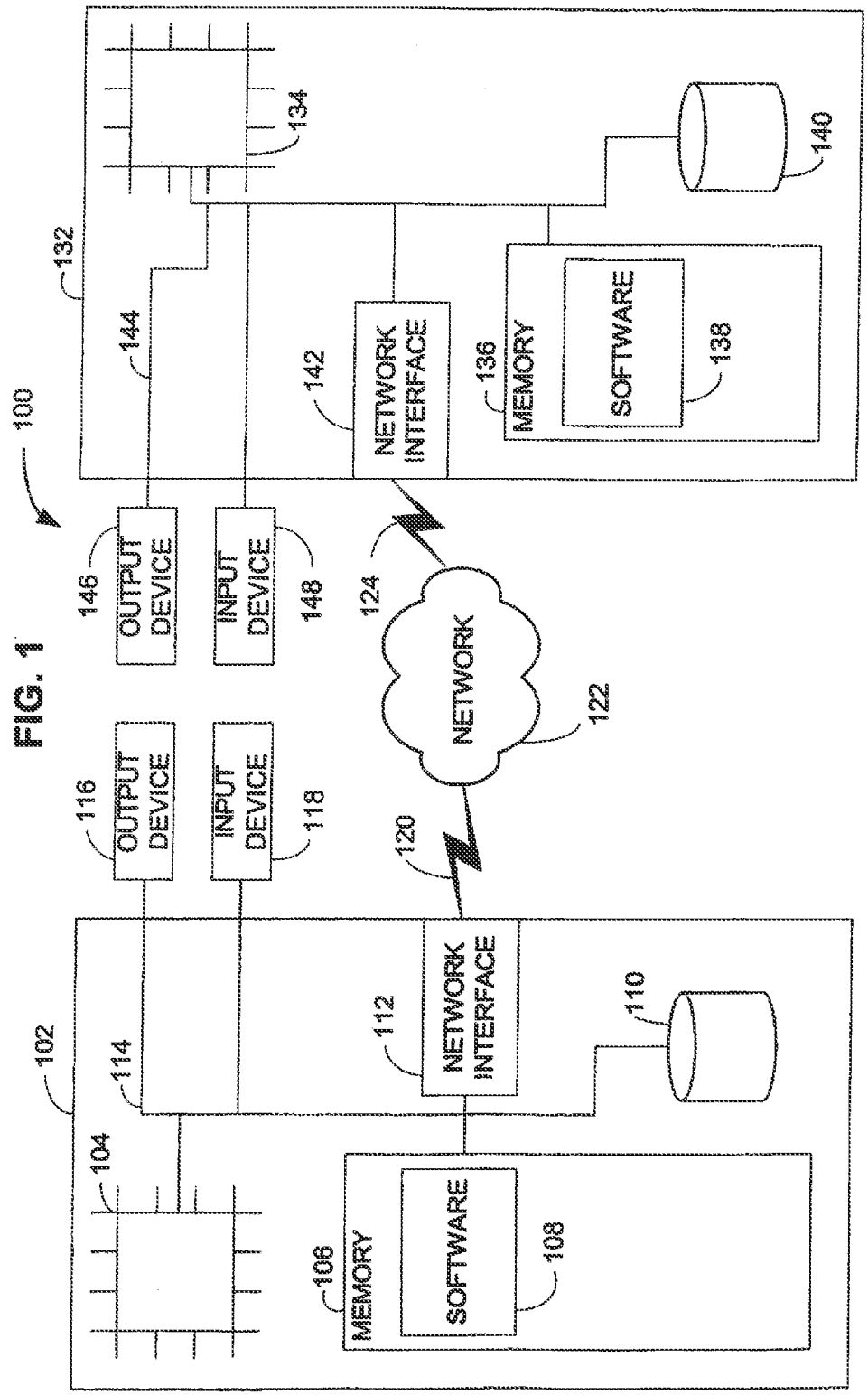
FIG. 1 is a schematic block diagram of a system according to an example embodiment.

Various embodiments of the present subject matter are provided herein. FIG. 1 is a schematic block diagram of a system 100 according to an example embodiment of the present subject matter. The system 100 includes a first node 102 and a second node 132 connected by a network 122.

The first node 102 includes a processor 104, a memory 106 and a network interface 112 coupled to bus 114. The first node 102 can optionally include a storage device, such as disk 110, an output device 116 and an input device 118. The second node 132 includes a processor 134, a memory 136, and a network interface 142 coupled to bus 144. The second node 132 can optionally include a storage device, such as disk 140, an output device 146, and an input device 148. In varying examples, the memories 106, 136 of both the first node 102 and the second node 132 are illustrated as including software 108, 138. Such software includes functionalities for at least communication of data to the network interface. In varying embodiments and applications, such software may be loadable to the memories 108, 138 from one or more sources, including, but not limited to storage 110, 140.

The network 122, in various embodiments, includes one or more of the INTERNET, a local area network ("LAN"), an intranet, a wide area network ("WAN"), or other network type.

The software 108, 138 is operable on the processor 104, 134 of its respective node 102, 132 to enable the nodes 102, 132 to exchange data over the network 122. The software 108, 138 causes the nodes 102, 132 to perform various actions associated with the exchange of data. These actions include exchanging data according to various timed acknowledgement methods as demonstrated below.

There are references to data transfer in this discussion in terms of an end-to-end "transfer path." The transfer path extends from the source host, such as the first node 102, to a destination host, such as the second node 132, across an IP network, such as the network 122. The transfer path has a characteristic "bottleneck bandwidth," a "network round-trip time," and a "path round-trip time."

The path bottleneck bandwidth is the minimum data transmission capacity (data units per unit time) along the entire length of the transfer path. It includes the bottleneck capacity of the sending and receiving hosts, such as the first node 102 and the second node 132, and the bottleneck capacity of the network 122, including one or more network hops. The bottleneck capacity of the nodes 102, 132 is the minimum data throughput (data per unit time) of the resources used in a data transfer, including the storage 110, 140 or memory 106, 136 read/write speed, the speed of the host bus 114, 144, the processor 104, 134 speed, and the network interface 112, 142 speed. The bottleneck capacity of the network 122 is the minimum bandwidth of the individual network links comprising the network path.

The path round-trip time ("path RTT") is the time required for a data unit to travel from the data receiver to the source and back. The path RTT, for example, includes the time to read the data unit from the second node 132 storage 140 or memory 136, transmit the data unit back over the network 122 to the first node 102, and read the data unit into memory 106, and transmit the data unit back over the network 122 to the second node 132 and read the data unit into memory 136. In one example, the time is measured using time "ticks" on the packet indicating the initiation of transmission and ultimately the time of reception.

The network round-trip time ("network RTT") is the time required for a data unit to travel over the network 122 beginning from the time it is sent over the network by the receiving host, to the time that the data unit arrives at the sending host, and then back to the receiving host, sometimes referred to as the "network latency."

In various embodiments, the network RTT includes the time for the request to travel "down the communication stack" in the destination host (network protocol layer to the network stack in the operating system to the physical interface), the time for the request to travel over the network to sending host, the time for the sending host to receive the retransmission request and to send the next scheduled data unit (includes a pass "up the stack" to receive the incoming retransmission request (physical interface to the network stack in the operating system to the system protocol layer) and a pass "down the stack" to send the next scheduled data unit (system protocol layer to network stack in the operating system to the physical interface), plus the time to travel over the network to the destination host.

The bandwidth-delay product ("BDP") of a given transfer path is an expression of the total data capacity of the path and is equal to the bottleneck bandwidth times the round-trip time. For the purposes of this disclosure BDP is referred to in terms of the network round-trip time, but note that for very high bandwidth networks the bottleneck bandwidth and BDP can actually be determined by the host bandwidth.

The data transfer is defined in terms of "data injection rate," "reception rate," and "useful reception rate," which determine "efficiency." The data injection rate ("Ri(t)") is the rate at which a sender injects data into the network on behalf of a sending application (e.g. measured in bits or bytes per second). The data reception rate ("Rr(t)") is the rate at which a receiver reads data from the network 122 on behalf of the receiving application. The useful reception rate ("Ru(t)") is the rate at which the receiver receives "useful" data, which includes data that has not been received previously (e.g. duplicate data).

Also used throughout this description are the terms "duplicate reception rate" and "transfer efficiency." The duplicative reception rate ("Rd(t)") is the rate at which the Receiver receives data already received.

Transfer efficiency is the ratio of the useful reception rate to the total reception rate (Ru/Rr). Maximum transfer efficiency (100%) is achieved when Ru approaches Rr and no duplicate data is received (meaning the protocol's redundant data overhead is negligible):

$Ru/Rr \sim 1$ and $Rd \sim 0$

A "perfectly efficient" protocol transfers all of the data required, which may require retransmission of lost data due to packet losses on the transfer path, with no redundant transmissions. Note that efficiency is not the same as the bandwidth utilization.

A stable system 100, according to various embodiments, converges to a steady-state throughput that does not oscillate in bandwidth usage in the face of packet loss, network delay and variation of packet loss and network delay. This allows the application 108 on system 102 to choose an arbitrary data injection rate Ri without disrupting the stability of the system 100. If the system 100 uses a fixed target rate, data is steadily injected onto the network 122 and does not create "bursts." In some embodiments, where the system 100 uses a dynamically adaptive rate, the rate evolves to an equilibrium rate in proportion to the distance from the equilibrium, not the current transfer rate, for stability at high rates. A stable protocol using a dynamically adaptive rate also does not overfill intervening router buffers in the transfer path and impair small "mice" traffic.

Some embodiments include parameters that are used to measure the system 100 performance include "predictability," "bandwidth fairness," and "independent rate control." The useful data reception rate (Ru) is "predictable" if the transfer throughput and time is deterministic over variable and unpredictable path conditions, such as variable round-trip latency, and packet loss.

A protocol is considered "bandwidth-fair" to standard TCP ("TCP friendly") if a single flow competing with TCP is equally aggressive and shares the bottleneck bandwidth BW in equal proportion, such that the rate of each flow is BW/N for N competing flows. For high performance and fairness on commodity networks, a reliable transfer protocol both shares fairly with TCP and has "max-min" fairness: When a TCP flow does not use its full proportional share of the bandwidth, the system 100, in some embodiments, consumes the remaining bandwidth.

The system 100 offers "independent rate control" to an application if the data injection rate is not coupled to the reliability mechanism, and the system 100 exposes an interface to the application to use in manipulating the rate control. Some parameters of various embodiments that can be manipulated include discrete rate settings such as a target rate or max/min ranges, relative aggressiveness, and prioritization policies. The system 100, in some embodiments, also provides intelligent feedback to the application, such as performance statistics, such as effective rate, contiguous bytes transferred, and the measured network impact in the form of round-trip time, packet loss on the transfer path, and protocol overhead.

To achieve the properties of system 100 described above (stability and predictability in the face of packet loss, network delay and variation of packet loss and network delay, efficiency Ru/Rr~1 and independent rate control), the proposed embodiments for a reliable bulk data transport system provide the following processes:

a. Retransmission requests are stored on the receiver when blocks are lost
b. The retransmission request storage has the following data structure properties
   i. insertion time in storage must be in constant time O(1)
   ii. retrieval or retransmission to be requested must be in constant time O(1)
   iii. finding and canceling pending retransmission request(s) when the retransmitted block is received must be in const time O(1)
c. Retransmission requests received by the sender are stored in sender storage. The sender storage must not grow when packet loss grows.
   i. receiver only sends retransmission requests at the rate that sender can send retransmitted blocks
   ii. sender storage of retransmission requests must allow for constant insertion time (the proposed embodiment provides a logarithmic insertion time O(log(n)), but since the size of the sender storage doesn't grow with the increase in packet loss, the insertion time is practically constant)
   iii. sender must send retransmitted blocks in order (smallest index first) for optimizing disk read performance, so finding minimum retransmission index in storage must be in constant time O(1).
d. Retransmission requests must reach the sender without delay. The receiver sends retransmission requests in packets of the smallest size possible given the amount of retransmission requests that need to be sent and the rate at which they have to be sent.
e. The receiving system must process the incoming data at the rate at which it is received. If data must be written to the receiving system's disk, it has to be done optimally.
f. If the receiving system cannot process the incoming data at the rate at which it is received, due to system limitations, the incoming data is dropped and considered the dropped blocks are considered lost for the purpose of the retransmission mechanism.

Figure 2:
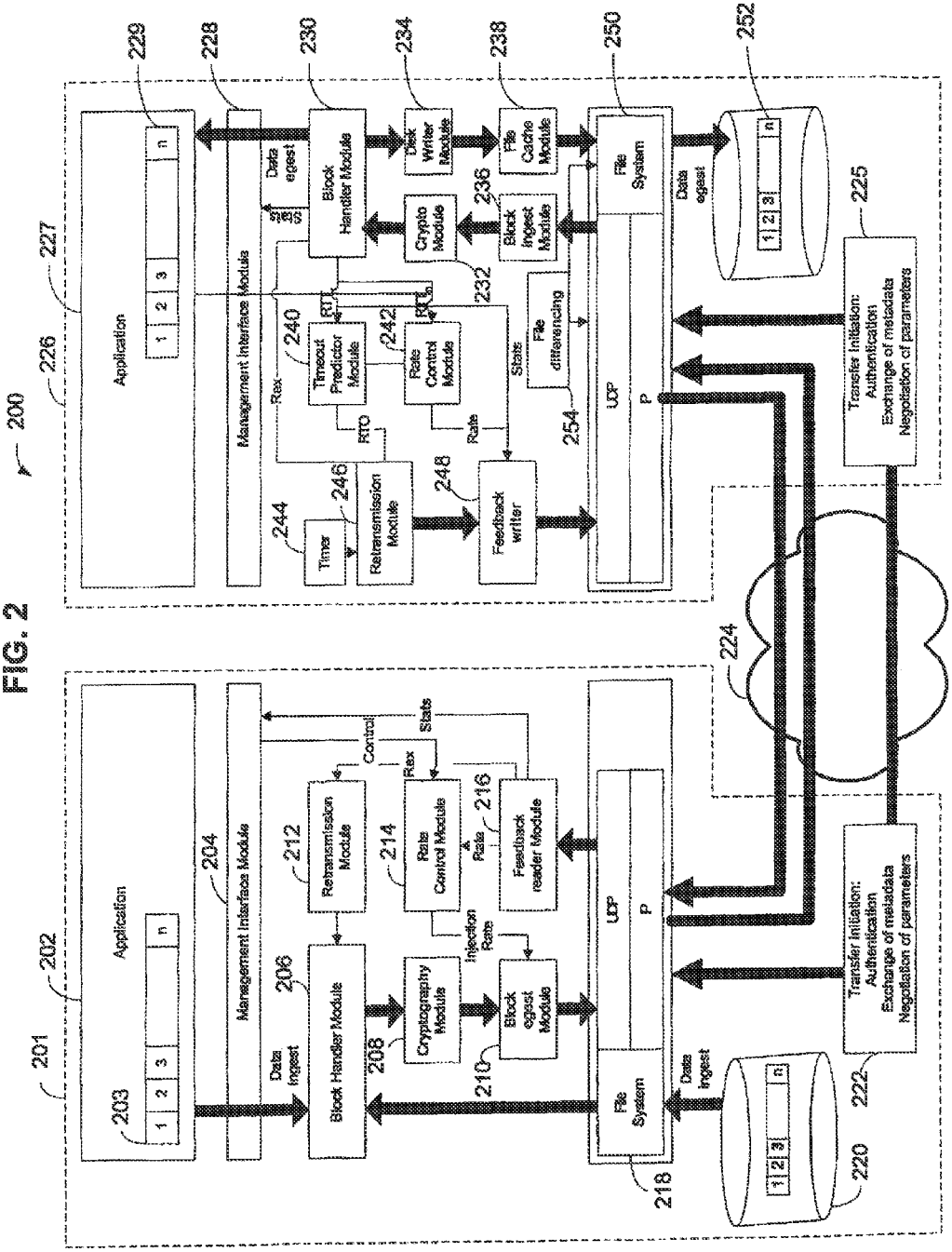
FIG. 2 is a block diagram of a sender/receiver system according to an example embodiment.

FIG. 2 is a block diagram of a system 200 according to an example embodiment. The system 200 includes a sender system 201 and a receiver system 226. The sender system 201 and the receiver system 226 are connected to one another via a network 224.

The sender system 201 of the system 200 embodiment includes a set of modules. These modules include a transfer initiation module 222, a data file system source module 218, a data application source module 203, a block handler module 206, and an optional cryptography module 208. The sender system 201 further includes a block egest module 210, a feedback reader module 216, a rate control module 214, a retransmission module 212, a management interface module 204, and a transfer initiation module 222.

The transfer initiation module 222 handles the establishment of a control channel with the receiver system 226. The control channel can use a reliable or unreliable base transport (e.g. TCP or UDP). The control channel can also be secured using a public-private key method, such as Secure Sockets Layer ("SSL") or Secure Shell ("SSH"). Using the control channel, the transfer initiation module 222 handles authentication on behalf of the sender application 202 by sending credentials to the receiver system 226, and can optionally exchange a per-session symmetric encryption key to use in data encryption. The transfer initiation module 222 also handles negotiation of transfer parameters, such as block size, target rate, etc., and exchanges the file or directory metadata for constructing the destination file and resuming partial transfers. Metadata includes attributes such as file name, size, access control parameters, and checksum.

The data file system source module 218 provides a sequence of data to transfer from a disk 220 or memory accessible to the sender system 201 through the sender system 201 file system 218. The sequence can be a file, a directory, a raw byte sequence, or virtually any other type or form of data.

The data application source module 203 provides a sequence of data to transfer in the sender application's 202 memory space.

The block handler module 206 ingests data by reading data blocks from the file system or from the user application's 202 memory space 203 when needed for transmission or retransmission.

The cryptography module 208 is an optional module within the sender system 201. The cryptography module 208 optionally encrypts data blocks and adds authentication digests for integrity verification.

The block egest module 210 writes data blocks to the network 224.

The feedback reader module 216 reads control feedback information from the receiver system 226, including requests for retransmission of missed blocks, transfer statistics, and the dynamic target rate. The feedback reader module 216 parses the message type and passes the payload to the appropriate module for processing, such as the retransmission module 212, the rate control module 214, or the management interface 204.

The rate control module 214 schedules blocks for transmission to respect the target rate (e.g. bits per second).

The retransmission module 212 stores incoming retransmission requests in a data structure that allows sorting by sequence number. The retransmission module 212 further issues block numbers to retransmit.

The management interface module 204 provides a monitoring and control interface from which control commands are issued and transfer statistics are read.

The receiver system 226 of the system 200 embodiment includes a set of modules. These modules include a transfer initiation module 225, a data file system destination module 250, a data application destination module 227, a block handler module 230, and an optional cryptography module 232. The receiver system 200 further includes a block ingest module 236, a feedback writer module 248, a rate control module 242, a retransmission module 246, a management interface module 228, and a transfer initiation module 225.

The transfer initiation module 225 handles the establishment of a control channel with the sender system 201. The control channel can use a reliable or unreliable base transport (e.g. TCP or UDP). The control channel can also be secured using a public-private key method, such as Secure Sockets Layer ("SSL") or Secure Shell ("SSH"). Using the control channel, the transfer initiation module 225 handles authentication on behalf of the receiver application 227 by sending credentials to the sender system 201, and can optionally exchange a per-session symmetric encryption key to use in data encryption. The transfer initiation module 225 also handles negotiation of transfer parameters, such as block size, target rate, etc., and exchanges the file or directory metadata for constructing the destination file and resuming partial transfers. Metadata includes attributes such as file name, size, access control parameters, and checksum.

The block ingest module 236 reads data blocks from the network 224.

The cryptography module 232 is optional. Embodiments including the cryptography module 232 decrypt encrypted data blocks and verify authentication digests for integrity.

The block handler module 230 processes incoming data blocks. This processing includes extracting a network round-trip time stamp and passing it to the rate calculation module and extracting the path round-trip time stamp and passing it to the timeout predictor module. The processing further includes copying the payload into the disk writer module 234 for egest.

The disk writer module 234 implements logic to maximize receiver input/output ("I/O") speed by minimizing inter-locking between the network reading and disk writing operations. The disk writer module 234 uses a number of buffers and allocates at any time one buffer for network 224 reading and one for disk 252 writing. Once a buffer is filled by the network reader, it is passed to the disk writer module 234 and a new buffer is assigned to the network reader.

The file cache module 238 implements logic to maximize the speed at which blocks are written to disk 252 or system memory by minimizing out-of-sequence writing and writing blocks of optimal size for the particular file system.

The data file system destination module 250 is a file or directory on a disk 252 or system memory accessible to the local computer through a file system where received data is written.

Data application destination module 229 is a sequence of memory in the receiver 226 application's 227 memory space 229 where received data is written.

The retransmission module 246 stores information of missed data blocks for retrieval by index. The stored information includes sequence number and timestamp of when the missed data block was originally sent.

The feedback writer module 248 sends feedback information to the sender system 201. The feedback information can include retransmission requests, statistics, calculated target rate, and any other information related to the exchange of data between the sender system 201 and receiver system 226.

The timeout predictor module 240 calculates the time to wait until requesting retransmission of missed blocks (RTO), using a recursive estimation algorithm that predicts the path round-trip time based on round-trip measurements.

The rate control module 242 calculates a target transmission rate according to a configured rate control mechanism specifying a fixed rate or a dynamically adaptive rate as a function of the measured network round-trip time.

The timer module 244 stores the sequence numbers of blocks for retransmission according to the absolute time at which the request for retransmission is due. The absolute time is given by the RTO calculated by the timeout predictor module. The timer module sends a list of block sequence numbers due for retransmission at the current time to the retransmission module.

The management interface module 228 provides a monitoring and control interface from which control commands are issued and transfer statistics are read.

The file differencing module 254 evaluates data already present at the receiver system 226 and compares it to the sender system 201 data to determine if any identical data is already present and does not require transmission. In one embodiment, a comparison is made between a receiver file having an identical name to the sender file based on attributes such as size, modified time and a content checksum. If the files are identical no data is transferred. If the file is partially transferred, the file differencing module determines the offset at which the transfer should begin, or resume.

It is understood that the exact functions, how they are grouped and interconnected, and the processes executed by each may vary without departing from the scope of the present subject matter.

Figure 3:
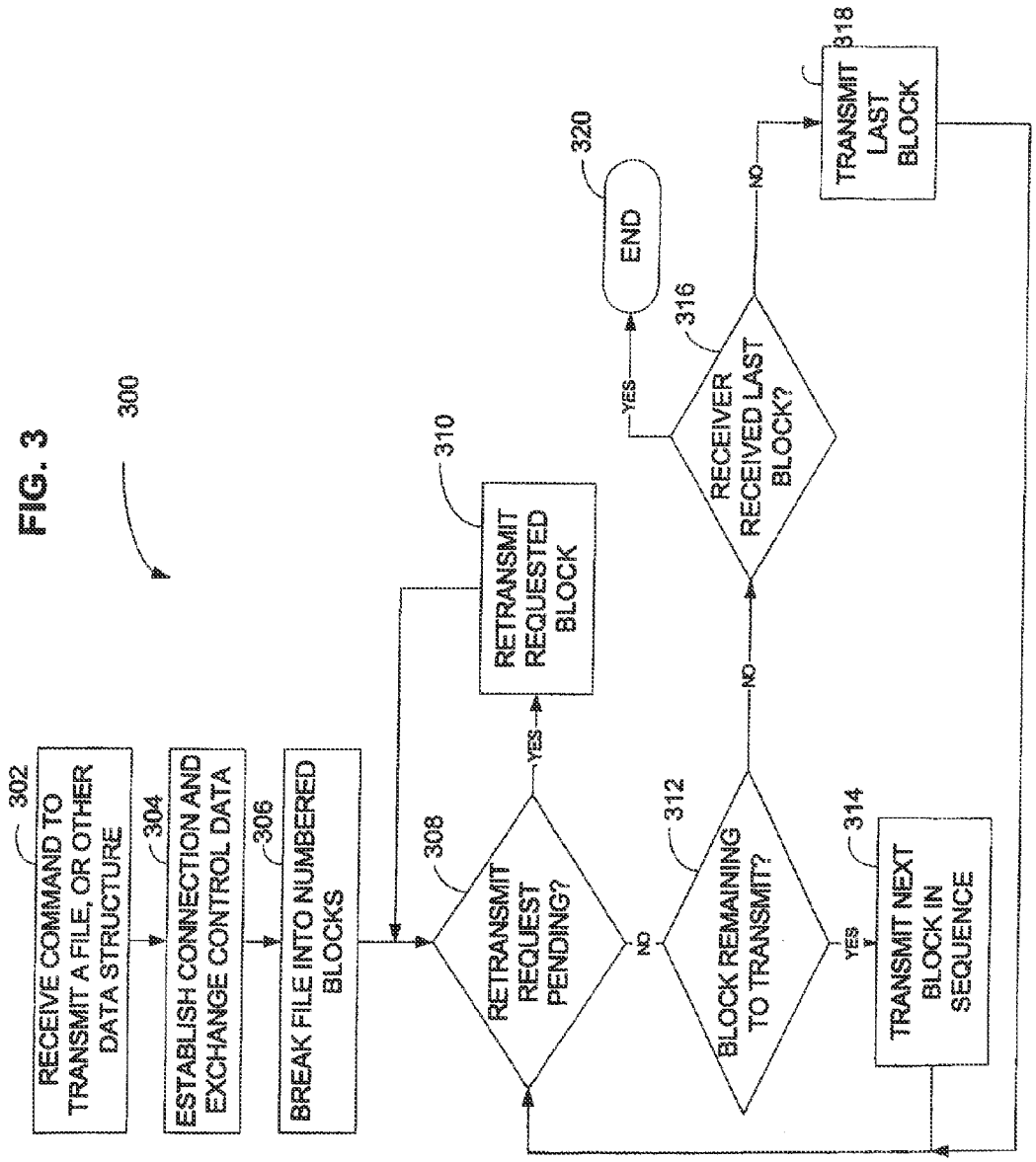
FIG. 3 is a block diagram of a data sending process according to an example embodiment.

FIG. 3 is a block diagram of a process 300 according to an example embodiment. The process 300 is a computer executable method to send a file, or other data structure, from a source system to a destination system. The process 300 includes receiving a command to transmit a file or other data structure 302 to a destination system, establishing a connection and exchanging control data with the destination system 304, and breaking the file, or other data structure, into numbered blocks 306. The process 300 further includes determining if a retransmit request has been received and is pending 308 and retransmitting any requested blocks 310 before transmitting any further blocks. The process 300 also includes determining if there are any remaining blocks to transmit 312, transmitting the next block in the numbered sequence 314. If there were no blocks remaining to transmit, the process 300 determines if an indication has been received from the destination system that the last block has been received 316. If that indication has been received, the process terminates 320, else the process retransmits the last block 318.

Figure 4:
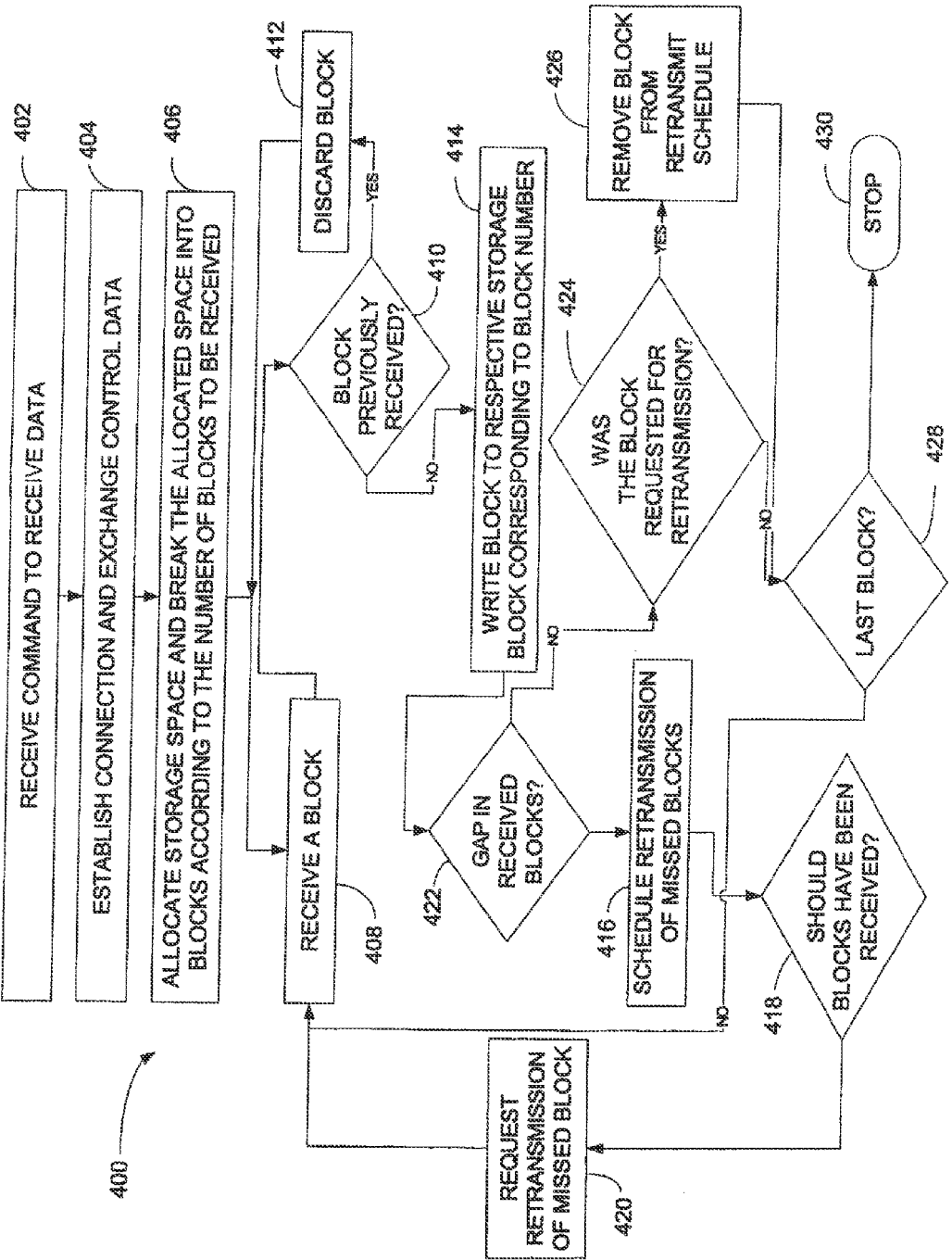
FIG. 4 is a block diagram of a data receiving process according to an example embodiment.

FIG. 4 is a block diagram of a process 400 to receive a file, or other data structure, on a destination system from a source system according to an example embodiment. The process 400 includes receiving a command to receive a file, or other data structure 402, establishing a connection and exchanging control data with the source system 404, and allocating storage space and breaking the storage space into blocks according to a number of blocks to be received 406. The process 400 further includes receiving a numbered block 408, determining if the block has been previously received 410, discarding the block if it has been previously received 412, or writing the block to its respective storage block corresponding to the number of the received block 414. The process 400 then determines if there is a gap in received blocks 422. If there is a gap, the process schedules retransmission of the missed block(s) 416, determines if the missed blocks should have been received already 418, and requests retransmission of the missed block(s) 420. The process 400 then determines if the received block was requested for retransmission 424. If the block was retransmitted, the block is removed from the retransmission schedule. The process 400 next determines if the block was the last block 428. If it was the last block, the process 400 terminates 430. Otherwise, the process 400 iterates until all blocks have been received.

It is understood that variations in the process flow and the performance of individual procedures may vary without departing from the scope of the present subject matter.

Some embodiments of the processes 300 and 400, illustrated in FIG. 3 and FIG. 4 respectively, provide computer applications the ability to reliably transport sequences of data blocks between one another. In some embodiments, process 300 and process 400 are included in a single computer application to provide a system the ability to be a sender and a receiver.

In operation, a sender system operates according to the process 300 of FIG. 3 to transfer a data structure in a sequence from a source to a receiver system destination at a requested target rate or at the path bottleneck bandwidth, whichever is less. The receiver system operates according to the process 400 illustrated in FIG. 4. The transfer is performed with high efficiency, regardless of the round-trip time of the path before transmission or variation in round-trip latency and packet loss during transmission.

When a constant target rate is requested, the transfer rate remains constant, less the packet loss rate, even with congestion. When a bandwidth-fair mode is used, the transfer rate should automatically adapt to utilize the available bandwidth when the network is lightly loaded, but adapt to a user-configured proportion of a TCP-fair rate when the network is congested (no bandwidth is available).

Figure 5:
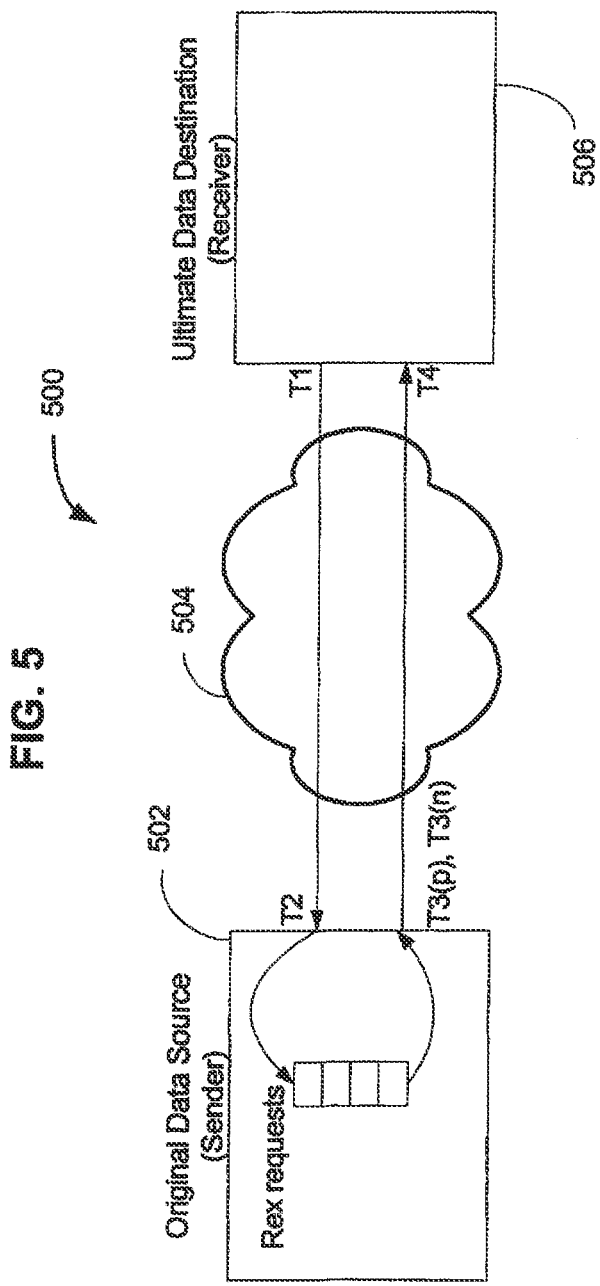
FIG. 5 is a data flow diagram of a system according to an example embodiment.
Figure 6:
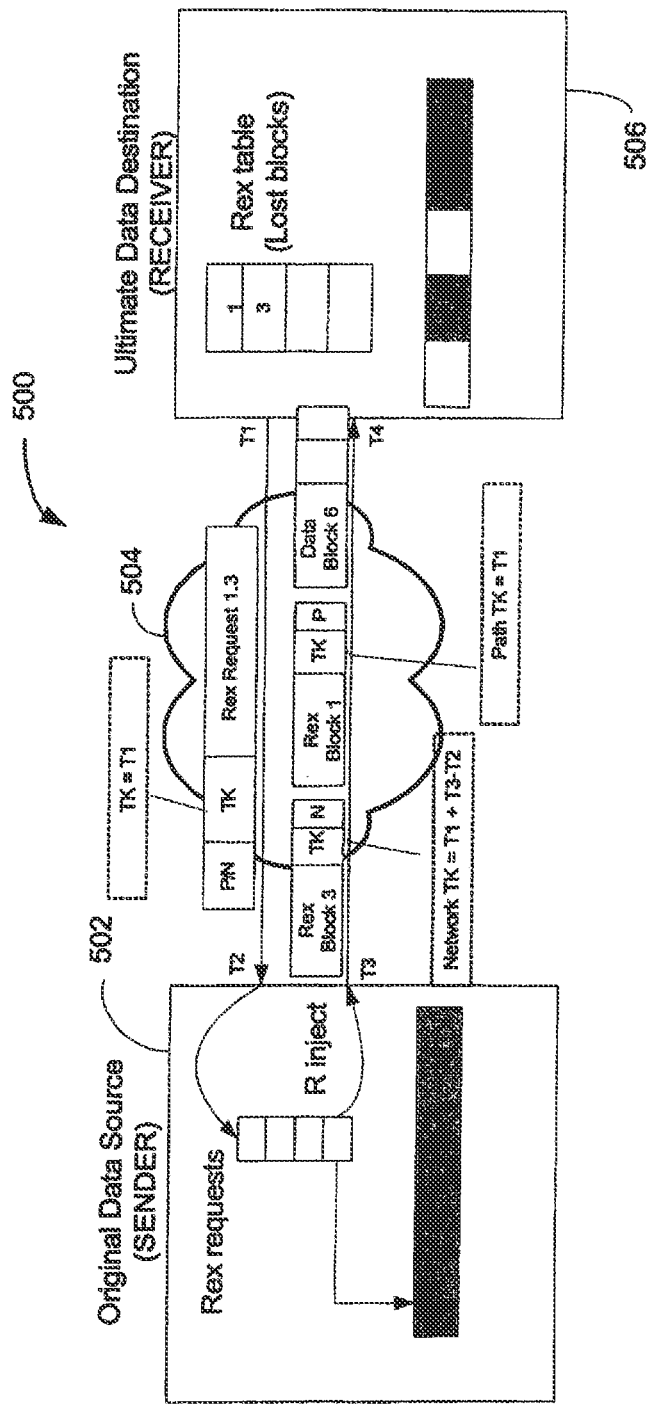
FIG. 6 is a data flow diagram of a system according to an example embodiment.
Figure 7:
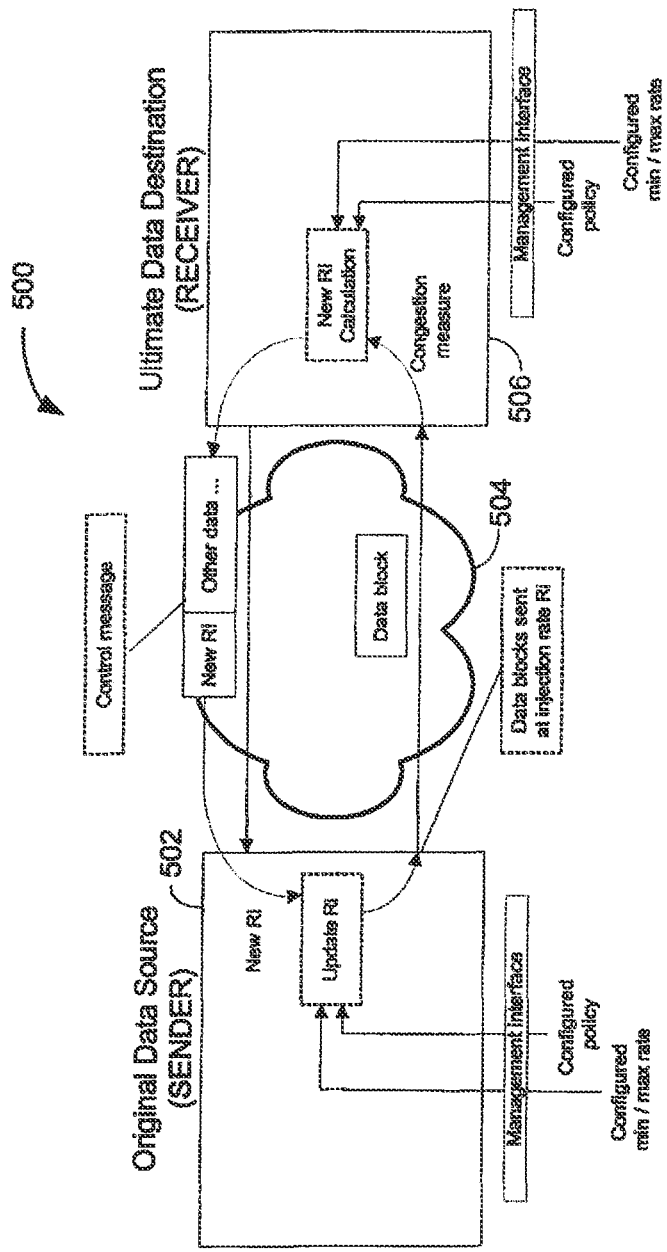
FIG. 7 is a data flow diagram of a system 700 according to an example embodiment.

FIG. 5, FIG. 6, and FIG. 7 demonstrate various aspects included in assorted embodiments of the present subject matter. These figures provide, among other things, details on round-trip time measurement, data retransmission, and calculation and update of data injection rates according to some examples, and are not intended to be an exhaustive or exclusive demonstration.

FIG. 5 is a data flow diagram of a system 500 according to an example embodiment. The system 500 includes a sender having an ultimate data source 502, a network 504, and a receiver having an ultimate data destination 506. Transmission requests are sent by the receiver carrying a time stamp that is used to calculate instantaneous round trip time for the reliability methods (i.e., the path RTT) and the congestion measurement (i.e., the network RTT). Each time stamp is accompanied by a flag for the type (n=network RU, p=path RTT). "n" retransmission requests (Trex) are sent on a regular time interval from the receiver to the sender. If there are no retransmissions when an "n" measurement is due, an empty retransmission request is sent.

FIG. 5 includes the following "T" reference signals that have the following meanings:

T1: time when a retransmission request is sent by the receiver

T2: time when the retransmission request arrives at the sender

T3($p$): time when the block satisfying the retransmission request is sent by the sender T3($n$): time when the first block is sent, after the reception of retransmission request flagged "network RTT" is received T4: time when this block arrives at the Receiver The following calculations are useful in various embodiments and can be performed using the measured times T1, T2, T3($p$), T3($n$), and T4:

$Treverse\_network = T2 - T1$ $Trex\_sendqueue = T3(p) - T2$ $Tforward\_network = T4 - T3(n \text{ or } p)$ RTT path USED FOR RETRANSMISSION REQUEST SCHEDULING (RELIABILITY ALGORITHM):

$RTT\_path = Treverse\_network + Trex\_sendqueue + Tforward\_network = T2 - T1 + T3(p) - T2 + T4 - T3(p) = T4 - T1$ RTT network USED FOR NETWORK CONGESTION (ADAPTIVE RATE CONTROL ALGORITHM):

$RTT\_network = Treverse\_network + Tforward\_network = T2 - T1 + T4 - T3(n) = T4 - T1 + (T2 - T3(n))$ FIG. 6 is a data flow diagram of a system 500 according to an example embodiment. The illustration of FIG. 6 provides greater detail of retransmission request generation and processing and time measurement according to some embodiments.

At time T1, the Receiver adds the lost blocks that have come due for retransmission to a retransmission request PDU. In some embodiments, retransmissions are "due" when a time equal to the current estimated RTT, the "RTO" has elapsed. The current time is recorded in a timestamp tick (TK) in the retransmission request PDU header and the tick type flag (path "P", or network "N") is set. Network "N" ticks are sent on a periodic interval. If it is not time to send an "N" tick, the tick is "P" by default.

At time T2 the retransmission request arrives at the sender. The Sender inserts the request in a queue sorted sequentially by block number. Each block is stored with its tick timestamp TK.

When a retransmission request is received containing a tick type "N," the next data PDU sent (retransmission or original) includes the tick TK adjusted for the sender processing time to measure the network time only: $TK = TK + (T3(p) - T2)$.

The sender continuously sends blocks at the injection rate $R_i$. All queued retransmissions are sent in order before new data is sent. If there are queued retransmissions, the sender chooses the lowest block number and re-reads that block from disk. The retransmitted data block, its timestamp TK, and type (P/N) are encapsulated in the PDU.

When a data block is received by the Receiver at time T4, if the block contains a tick, the Receiver updates the predictive estimation of the network or path round-trip time (RTO). The Receiver computes the sample round-trip time (RTT_i) from the embedded tick, and inputs the sampled round trip time into a predictive estimator function to compute the RTO for the path or network.

FIG. 7 is a data flow diagram of a system 500 according to an example embodiment. This illustration shows both the calculation of the new injection rate by the receiver 506 as a function of input parameters such as max/min rate, bandwidth sharing policy such as constant rate or automatically-adapting rate, and aggressiveness relative to TCP, all of which may be provided in real-time through a management interface, and the propagation of the new rate to the sender.

The sequence of data to be transferred is divided into equal-sized blocks. The size of the data blocks is calculated such that the protocol data unit (PDU) carrying the data (payload+application header+encapsulating packet headers) will not surpass the maximum transmission unit (MTU) for the networks this PDU is likely to traverse.

The system guarantees the transmission of all blocks and reconstruction of the source file at the destination. Blocks are numbered in sequence. The system receiver notes missed blocks and requests the system sender retransmit the missed blocks until all blocks are received and written to the destination file. Received blocks are written to disk or memory as they are received, creating a sparse file that is gradually filled in until completion.

The system sender starts off by sending blocks in order, at the target rate specified by the user (either as an absolute value or as a percentage of an automatically discovered bandwidth capacity), or calculated by the adaptive rate mechanism. In adaptive rate mode, the sender may optionally use a slow-start mechanism where the initial sending rate is a fraction of the sending rate and the adaptive rate algorithm automatically ramps up the target rate over a few seconds. Each block includes a block number, used for reconstructing the file at the receiver. The sender can receive requests for block retransmissions from the receiver. In that case, the sender stores the requests for retransmissions and resends the requested blocks at the rate specified by the user or calculated by the adaptive rate mechanism. The server sends out all the blocks due for retransmission before sending any new blocks. When there are no more blocks to be retransmitted or new blocks to transmit, the server enters a termination state in which it sends the last block of the file repeatedly until the receiver signals the reception of the entire file, or sends more retransmission requests.

The system receiver waits for the reception of data blocks. Upon reception of a block, if the block has not been received previously, the receiver passes the block to a memory, such as a disk subsystem or system memory. If the block sequence number indicates a gap in the reception of blocks, the receiver schedules for retransmission all of the missed blocks having sequence number between the last previously received block and this block.

The retransmission scheduler operates to request retransmission of missed blocks as a function of a timer that determines when to send retransmission requests. The timer of the retransmission schedule is based on a predictive measurement of the path round-trip time. When a batch of retransmissions comes due, the receiver sends requests for retransmission of these blocks to the sender. When the retransmitted blocks are received, their entries are removed from the pending retransmission scheduler. The blocks are passed to memory, disk, or other location with the appropriate file offset position, and are written to the file. When the last data block has been received, any remaining retransmissions are requested according to a fast termination algorithm. When all blocks have been received, the receiver sends a termination message to the sender.

Various other embodiments provide methods to achieve high data transfer efficiency and predictable transfer rates independent of round-trip latency and packet losses for arbitrarily high fixed injection rates.

Some such embodiments provide a block-based transport providing a data transfer application non-sequential data access and provide highly precise injection rates that are decoupled from the reliable reception of data.

Embodiments providing a data transfer application non-sequential data access include a block-based transport requesting the data source, such as a disk system, memory, or application, to provide data in discrete blocks, and not necessarily in sequential order.

These embodiments define the size of a data "block" and request the application to provide blocks, individually or as a range. For example, in case of a regular file transfer, such embodiments define a block as a number of bytes. (The size may be configured by the application, a fixed value pre-coded in the implementation, or discovered through probing of the MTU size of the transfer path. For maximum throughput efficiency, the block size should be as large as possible without exceeding the path MTU and causing packet fragmentation, in order to avoid any unnecessary overhead in reassembling fragmented packets at the lower IP layer.). The file is divided in blocks, with the first block being block number 1. There is no guarantee of the order and the number of times a given block will be requested. At any given time, the application is provided with the smallest block number it will request. Based on this information, the application can discard earlier blocks, avoiding the overhead of storing large data buffers in memory and potentially operating on sequential data in parallel.

Some embodiments include a data injection rate independent of its reliability mechanism. In such embodiments, the injection rate does not depend on whether data was successfully received and the rate control algorithm is under explicit, independent control of the application. This provides the ability to achieve network delay and packet loss-independent transfer performance, plus independent transfer rate control given to the application.

Applications operating according to these embodiments use a target injection rate, either configured by the application (for example, as an absolute value or as a percentage of a configured or automatically-discovered bandwidth capacity) or calculated using an equation-based algorithm, and controls the injection rate using timing rather than acknowledgements. This rate control maintains the target rate with relative precision, independent of system load, and is CPU friendly to other applications. Because these embodiments do not require sequential acknowledgement of transmitted data to clock new data into the network, data can be re-requested from the application in any order, eliminating the need to maintain redundant storage of transmitted blocks until receipt acknowledgement is received.

In "fixed rate" mode, applications according to these embodiments maintain a constant injection rate, or when using an "adaptive rate" control algorithm, adjust the target rate according to ongoing measurement of the available network bandwidth and a configurable aggressiveness relative to TCP that can be explicitly exposed to the application. The application can set on the fly the rate control mode (e.g. fixed or adaptive), and the boundary parameters including the target rate, the maximum and minimum transfer rates, and the scaling factors for bandwidth fairness. (While current implementations may find it most useful to express the scaling factor for the calculated target rate relative to standard (Reno) TCP, the scaling may be relative to any TCP-compatible implementations having a steady-state throughput as a function of measurable end-to-end network parameters such as round-trip time and packet loss.)

In some embodiments that maximize network utilization, it is important that the sender system output data precisely, at the required injection rate (calculated or predetermined). The problems that need to be solved to achieve this relate first to timing mechanisms provided by operating systems and second to system load.

First, on multi-process operating systems, the granularity of process switching is much larger than the "time between packets" required by high-rate network transmissions. Typically, the granularity is on the order of 10 to 20 milliseconds, which means that once a process yields the CPU, it will not be running again for at least 10-20 milliseconds. Sending one data packet of 1500 bytes every 10 milliseconds only yields a transfer rate of 1.2 Mbps. Spinning (as opposed to yielding CPU) provides high precision timing but is not practical, unless the machine can be dedicated to the network transmitter. Some embodiments of the present subject matter provide data transfer on commodity, multi-tasking systems, and do not have the luxury to monopolize the CPU.

Second, higher system load, in terms of CPU and disk utilization, may adversely affect the precision of the injection rate, causing it to fall behind.

The method used by some embodiments of the present subject matter provide highly precise injection rates. These injection rates are CPU friendly and are not affected by variations in system load as long as there is enough available processing power.

The injection rates are CPU friendly because packets are grouped in batches. The batch size is calculated such that the inter-packet delay ("IPD") is large enough to allow the sender to yield the CPU and to recover from the resulting process switching delay without compromising the injection rate.

The injection rates are not affected by variations in system load because such embodiments measure the time to process the transmission of one packet, or batch, and compensate for the lag caused by this processing time plus y the time spent in process switching yielding the CPU. The actual inter-packet delay is compensated for the measured lag, thus keeping the injection rate constant in the presence of variable system load.

The following pseudo code is an example algorithm used to inject packets into a network to achieve high-precision network transmission rates. The minimum inter-packet delay ("IPD") restriction of 5000 microseconds (5 milliseconds) in the calculation of batch size and IPD is chosen such that a delay caused by process switching (10-20 milliseconds) can be recovered from over the next 3 to 4 batches.

Calculate inter-packet-delay (IPD) and batch size for a given injection rate (Ri):

```
IPD = block_size * 8 / rate   [microseconds]
if IPD < 5000 microseconds
    batch_size = 5000 / IPD
    IPD = block_size * 8 * batch_size / rate
[microseconds]
else
    batch_size = 1
```

Sender Loop:

```
lagbehind = 0
sleeptime = 0
Repeat until transfer finishes
    /* Sleep routine */
    sleep_spin = sleep_time % 1000 microseconds
    sleep_yield = sleep_time − sleep_spin
    sleep (sleep_yield microseconds)
                    /* This may take longer */
    if time left
        spin remainder of time /*Small, for
precision*/
    /* Actual network transmission */
    send batch of batch_size blocks
    delay = current time in microseconds − last_sent
    last_sent = current time in microseconds
    /* Calculate sleep time and lag behind */
    if IPD > delay
        sleeptime = IPD − delay
        if lagbehind > sleeptime
            lagbehind = lagbehind − sleeptime
            sleeptime = 0
        else
            sleeptime = sleeptime − lagbehind
            lagbehind = 0
    else
        sleeptime = 0
        lagbehind = lagbehind + (delay − IPD)
        if lagbehind > 100*IPD
            lagbehind = 100*IPD
```

Some embodiments also provide methods to maintain high data transmission efficiency independent of path delay and packet loss for high injection rates.

To avoid the transmission speed bottleneck of a positive-acknowledgement reliability algorithm, some methods according to the present subject matter use an unreliable transmission channel, such as the User Datagram Protocol ("UDP"), that provides no injection rate throttling or recovery of lost data. These methods achieve reliability by implementing their own algorithm for retransmission of lost data. The retransmission algorithm accurately determines when a data block is truly "lost," between an original source and an ultimate destination, as opposed to delayed or reordered, and thereby achieves stable, high efficiency independent of end-to-end path latency and packet loss, for high injection speeds. The retransmission algorithm allows a combination of high injection speed and useful throughput, invariant with high round-trip time, such as long distance intercontinental networks, high random packet loss, such as on some wireless media, and variable latency and packet loss rates, such as public Internet links congested with heavy load.

Some embodiments of the retransmission algorithm use "negative acknowledgements." Negative acknowledgement is when the receiver notifies the sender only of missed blocks and the sender retransmits accordingly.

Some embodiments of the present subject matter continuously sample the path round trip time and uses a predictive estimator function to accurately predict the round trip time and determine when a missed block is truly lost and should be retransmitted. The retransmission request is neither too early, maintaining stability, nor too late, reducing efficiency. The useful received data rate is constant and equal to the injection rate less the packet loss rate of the path, for high injection rates. Thus, high transmission efficiency and high bandwidth utilization is realized even at high speeds over links having high loss and variable latency.

The problem of an optimal retransmission request algorithm can be modeled. For example, given a path injection rate Ri(t), for a efficient transmission approaching 100%, the useful data rate Ru(t) should equal Ri(t) less the packet loss rate P(t) times Ri(t):

$$\text{High efficiency} \Rightarrow Ru(t) \approx Ri(t) - P(t)*Ri(t)$$

For utilization approaching 100% of an arbitrarily fast network, this must hold for Ri ranging from a few kilobits per second to an arbitrarily high speed (1 gigabit per second+).

To achieve this substantially optimal model, the retransmission request for a missed block should wait just long enough for a block in flight, potentially delayed or reordered, to be received, and no longer than the time to send a retransmission request to the sender and receive a response given the sender's target injection rate Ri.

While the exact time to wait cannot be determined a priori, it can be estimated to a high degree of accuracy by continuously measuring the path round-trip time and using a class of predictive estimation equations known as recursive prediction error or stochastic gradient functions to predict future path round-trip time. Some embodiments of the present subject matter includes the application of this in a block-based data transmission system to accurately estimate the path round-trip time and to compute the time to wait to request a retransmission. These embodiments in turn achieve high transmission efficiency.

In some embodiments, retransmission scheduling includes accurate prediction of path round trip time, accurate sampling of current round trip time, and high performance retransmission scheduler based on predicted path round trip time.

For an accurate retransmission timeout (RTO), it is essential to accurately predict the evolution of the path round trip time over the time scale used for sending retransmission requests and receiving retransmitted data blocks. Various embodiments of the present inventive subject matter calculate the RTT prediction by sampling the round-trip time for the full transfer path, which includes the sender processing time, e.g., time to search the retransmission data structure and re-read a block from disk, in addition to the time a data block travels on the network. In such embodiments, the sender-side processing algorithm is constant with the number of retransmission requests, and thus can be safely factored into the round-trip time prediction.

Further, some such embodiments calculate an estimate of the mean path round trip time ("smooth RTT" or "SRTT") from the sampled round trip time and derives a delay variance ("RTT variance") from the difference between the RTT sample and the smooth RTT. Then the predicted network delay is calculated based on the smooth RTT and the RTT variance.

Upon reception and calculation of a new RTT sample (RTTi), the value of the smooth RTT ("SRTT") is calculated as:

$$SRTT_{i+1}=SRTT_i+\gamma*(RTT_i-SRTT_i)$$

$\gamma$ is a gain factor that determines how much the current RTT sample weighs in the new smoothed RTT estimate. The difference between RTTi and SRTTi represents the error in the previous prediction, consisting of some random error in the measurement and some error due to a bad previous estimate. Over time the random error components cancel and the error due to bad predictions push the estimate to the "real" average. A small gain factor thus ensures that a particular SRTT is not affected too much by random error. One embodiment uses a gain factor, $\gamma$, of ⅛.

To take into account the oscillation of the SRTT estimate around the true average, the RTT variance (VRTT) is calculated as:

$$VRTT_{i+1}=VRTT_i+\eta*|RTT_i-SRTT_i|$$

Where $\eta$ is the attenuation factor. One embodiment uses an attenuation factor, $\eta$, of ¼.

The predicted RTT (=RTO) is calculated as:

$$RTO_{i+1}=SRTT_{i+1}+1/\eta*VRTT_{i+1}$$

The RTO value is also range bounded to the practical round-trip limits of typical networks in one implementation.

Another factor in network delay prediction is the WIT sampling frequency. For the transfer rate range used by some embodiments (20 Kbps–1 Gbps), the sampling period is set to 10 milliseconds.

The accuracy of the predicted RTT (=RTO) depends on the accuracy of the sampled RTT. A receiver generates an accurate "clock tick," using the best clock mechanism offered by the operating system. The tick is generated immediately before sending a retransmission request and is embedded in the retransmission request PDU. The request travels over the network to the sender. When the sender is ready to retransmit the corresponding block, it embeds the clock tick in the data PDU, and sends it to the receiver. Upon reception of a data PDU containing a clock tick, the receiver determines the path RTT by subtracting the received clock tick from the current clock. This method is accurate because it uses the highest precision clock mechanisms available from the operating system, and includes the processing time on the sender.

The receiver of a negative acknowledgement ("NACK") retransmit requests must handle the requests for block retransmission. The following describes an embodiment that handles block retransmission requests, detecting lost blocks, requesting retransmission of lost blocks, and canceling pending retransmission requests when the requested blocks are received.

Some embodiments according to present subject matter number each block in the data source sequentially from 1 to N, where N=file size/block size [+1 if file size modulus block size >0]. Other embodiments use various other means to identify individual blocks in a sequential manner.

A sender appends the block sequence number to the payload in each protocol data unit ("PDU"). The receiver detects a lost block when it receives a block with a sequence number greater than the next sequence number expected. Because block can be received out of order, the receiver does not immediately request a retransmission of the lost block, but schedules the first request for retransmission after one RTO. This allows for reordered block in flight to be received without creating duplicate transmissions by prematurely asking for retransmission.

The receiver stores all the pending requests for retransmission along with the precise absolute time when they are due. The time is calculated by rounding up the due time value by the precision of RTT measurements, to ensure that calculated due time is not less than the theoretically correct value due to the measurement error.

Time due[millisec]=Time loss detected[millisec]+ RTO at detection time[millisec]+RTT measurement precision[millisec]

Once a request for retransmission is sent by the receiver to the sender, a subsequent request for retransmission is scheduled at the due time calculated with the same method. Consequently, once a lost block is detected, there is always a pending request for its retransmission until the block is received and currently pending retransmission is cancelled.

An accurate path round trip time prediction requires that the overhead in sending and processing retransmission requests is constant with the number of retransmissions, and does not compound the data loss. For high-speed transfers over difficult network conditions, the number of retransmissions can be very large. Various embodiments include a number of elements that ensure near constant processing time on the sender and receiver and that maximize the probability of successful delivery of retransmission requests, even for large numbers of retransmissions.

In such embodiments, when a retransmitted block is received, the pending request for its retransmission is retrieved from the scheduler and cancelled. When loss is high (the number of retransmissions is large), this can be an expensive operation if the retrieval method is proportional to the number of retransmissions. The retrieval method used by these embodiments ensures a constant access time for near optimum useful throughput in the face of high loss. On the receiver, when a block is first detected as lost, the request for its retransmission is stored in a linear array. The index at which it is stored is sent in the request for the retransmission. On the sender side, this index is stored along with the requests for retransmissions. When the sender retransmits a block, the index is appended to the carrying the block, allowing the receiver to lookup the pending retransmission in constant time, independent of the total number of blocks.

To avoid accumulation of outstanding retransmissions, the present embodiment sender always retransmits any lost blocks before sending new blocks. Otherwise the receiver would accumulate more loss and schedule more requests for retransmissions, thus driving itself into congestion collapse and degrading file transfer performance. In order to retransmit blocks, the sender must re-read block data from the source file. This seek-back-and-read operation can be expensive for high rate transfers and particularly taxing when the packet loss is high and file sizes are large. The receiver throttles the requests for retransmissions to match the rate at which the sender can resend the lost blocks so the storage of pending retransmissions on the sender side is near constant in size (doesn't grow with the network loss).

Over half-duplex media, as well as over network devices that induce a half-duplex behavior due to undersized queuing resources, large IP packets on the reverse path, receiver to sender, may not be able to reach the sender. This causes the sender to continue sending new blocks, which accelerates the rate at which loss accumulates at the receiver and immediately degrades file transfer performance.

The receiver of the present embodiment takes the following counter-measures:

(a) Given the number of requests for retransmissions the receiver has to send per unit of time, and that the sender can retransmit no faster than the sending rate, the receiver sends the smallest number of blocks to be retransmitted in a retransmission request PDU, as determined by the sender's target rate and the retransmission request rate.

rexs per request/request interval(s)=MIN(target_rate (bps)/block_size(bits), rex_request rate(rex/s)) *req_interval The request interval is a constant equal to the retransmission timer resolution (10 ms in the current implementation), EXCEPT in the following special case:
If the sender's target rate is small such that the minimum request rate would yield less than 1 rex per request, the interval is lengthened to the minimum interval required for 1 rex per request.

minimum request interval=block size(bits)/target rate (bits/s)

(b) The maximum size of a retransmission request is configurable by the application and by default is set to be less than the minimum typical network MTU (1492 bytes).

In embodiments with file transfer rates close to the disk read/write throughput, disk I/O performance can become the bottleneck. The sender in such embodiments alleviates disk seeking by always resending the blocks nearest the beginning of the file first. This allows the sender to read sequentially the blocks to retransmit, and the receiver to write out the received blocks sequentially. On the sender side, the due retransmissions are stored in a sorted data structure: a modified Red Black Tree to store the sequence numbers for the due retransmissions sorted by number. The Red Black Tree is a classic, binary tree data structure, well described in computer science literature, and will not be described in this document. The block sequence numbers are node keys in the tree.

Based on the fact that only the smallest block number (the minimum) needs to be retrieved, the Red Black Tree has been modified to provide a nearly constant-time retrieval. Insertion time is that of a regular Red Black Tree.

The modified Red Black Tree offers the following primitives:

insert_block(block_seq_number)retrieve_minimum block( )

The Red Black Tree keeps track of the node having the minimum sequence number, called the current minimum node. Upon insertion, it is trivial to keep track of the minimum node: knowing the current minimum, if the block to insert has a sequence number lower than the current minimum node's, it becomes the minimum. If not, the current minimum node is unaltered.

Upon retrieval, the minimum node is removed from the tree and returned to the application, and a new minimum is found and stored. In support of the algorithm used to find the new minimum node, the following statements are true:
the current minimum node has no left descendent (or the left descendent will have a key less than the minimum node's)
the current minimum node is the left descendent of its parent (or its parent will have a key less than the minimum node's)
the subtree rooted at the current minimum node's right descendent has all keys less than the current minimum node's parent's key, and the rest of the tree's keys To find the "next" minimum node, before the current minimum node is removed from the tree, the modified Red Black Tree uses the following algorithm:

```
If the current minimum node has no right descendent,
    the next minimum node is its parent.
Else, the next minimum node belongs to the subtree
    rooted at the current minimum node's right
    descendent.
The next minimum node is retrieved by inorder
    traversal of the mentioned subtree.
```

The modification to the regular Red Black Tree algorithm used in the various embodiments is described below.

```
minimum_seq_number = -1;
insert_block ( block_seq_number)
    regular RBT insert block_seq_number
    if minimum_seq_number == -1
        minimum_seq_number = block_seq_number
    else if block_seq_number < minimum_seq_number
        minimum_seq_number = block_seq_number
retrieve_minimum_block( )
    store minimum node to be returned to caller
application
    /* Find new minimum node */
    if current minimum has no right descendent
        new minimum = current minimum node's parent
    else
        find the new minimum by inorder traversal of
the subtree
        starting at the current minimum node's right
    remove minimum node from tree
```

Some embodiments of the present subject matter require random disk access and frequent seeking back and forward in a file if there are retransmissions required. While some operating systems offer high-performance file system random access, other operating systems do not handle random access well and reduce the disk read/write speed by a substantial factor. The receiver side in the present embodiments is the most affected because disk write operations are more expensive.

In some embodiments, the receiver implements a disk write cache mechanism to minimize random disk access. The size of the memory cache is proportional to the file transfer target rate, using the following calculation:

file_cache_size=((transfer_rate [bps]/1800*block_size)/write_size)* write_size

The size of the file cache is proportional to the disk write size buffer, "write_size." The
disk write size buffer is a multiple of the size of a disk cluster, which, depending on the file system, can be 512 bytes, 1024 bytes, 4096 bytes, 8192 bytes, or even higher. Some embodiments use a disk write size of 64 Kbytes.

The file cache receives data blocks from the receiver, buffers the blocks, and decides when and what data to write to disk. At the end of the file transfer, the cache flushes its contents to disk. The file cache solves the following problem: When data loss is high, the cache should delay the actual disk write as much as possible to provide the receiver the maximum opportunity to receive retransmitted blocks and complete the gaps in the cache created by packet loss. Ideally the disk write occurs when all of the constituent blocks in the write buffer have been received. When data loss is low, the file cache writes to disk as soon as possible, without caching a lot of data, to improve the flushing time at the end of the file transfer.

Some embodiments of the method to achieve high disk caching performance include using a high watermark indicator in writing to disk. When data written to the cache exceeds the high watermark, the cache writes out to disk from the beginning of the cache. The high-loss versus low-loss caching policies described above are achieved by calculating a running average of the size of the receiver's retransmission table.

The running average is calculated such that its value tracks the number of retransmissions in the receiver's table when they increase and adjusts slowly down when they decrease. The receiver thus follows uptrends closely and lags behind the downtrends.

Uptrend:

$$retransmission\_avg_{i+1} = retransmission\_avg_i + 1 * delta_{i+1}$$

Downtrend:

$$retransmission\_avg_{i+1} = retransmission\_avg_i + \tfrac{1}{16} * delta_{i+1}$$

Where $delta_{i+1} = retransmission\_sample_{i+1} - retransmission\_avg$

The high watermark is calculated as a logarithmic step function of the retransmission running average.

high_watermark= cache_size*0.1, if retransmission_avg in [0,100)

cache_size*0.2, if retransmission_avg in [100,200)

cache_size*0.3, if retransmission_avg in [200,400)

cache_size*0.4, if retransmission_avg in [400,900)

cache_size*0.5, if retransmission_avg in [900,1800)

cache_size*0.6, if retransmission_avg in [1800,4000)

cache_size*0.7, if retransmission_avg in [4000,8000)

cache_size*0.8, if retransmission_avg in [8000,18000)

cache_size*0.9, if retransmission_avg in [18000,infinity)

The high watermark is readjusted after every disk write.

Definitions. At any point in time a network path may have "available bandwidth" or "no available bandwidth". A path has available bandwidth when the sum of the bandwidth used by all flows currently traversing the path is less than the bottleneck bandwidth of the path, and some bandwidth remains unused. Conversely, a path has no available bandwidth when the sum of the network bandwidth demanded by all flows is greater than the bottleneck bandwidth of the path. In this case, demand for bandwidth exceeds supply and the bandwidth must be shared among the various flows on the link. "Bandwidth-fairness" refers to the relative bandwidth consumed by individual flows.

Various embodiments of the present subject matter provide stable, efficient data throughput, and fully utilized unused bandwidth on shared links in the presence of other IP data flows when there is available bandwidth. On networks having no available bandwidth, these embodiments automatically adapt their transmission speed for fair bandwidth sharing with TCP.

These embodiments include an adaptive rate control mode that uses network queuing delay as a signal of network congestion (or conversely, available bandwidth). On networks with available bandwidth, as signaled by low queuing delay, these embodiments determine the data injection rate as a function of the measured queuing delay. Prior art has shown that queuing delay provides an accurate congestion signal to adapt the transfer throughput of TCP to the dynamically varying available bandwidth, and have applied equation-based rate control as a function of queuing delay to maintain stable high TCP throughput at bandwidth capacity on certain high speed networks. The stable high throughput of prior art applies only when there is negligible packet loss (still reducing throughput on packet loss events), and only on networks with high bandwidth (does not utilize bandwidth on low speed networks), and at the expense of bandwidth fairness to other TCP flows. On networks with available bandwidth, the proposed embodiments do not reduce throughput on random loss events (applying the delay-based adaptation to a packet-loss tolerant reliable UDP transport), and thus maintain high throughput even on media with high packet loss rates, such as a wireless network. The proposed embodiments also use modified scaling parameters to cause systems to approach full bandwidth utilization on all practical networks (few kilobits per second to gigabits per second), not just networks of high speed and negligible packet loss). In addition, the proposed embodiments automatically use a TCP-friendly rate on networks with no available bandwidth.

On networks with no presently available bandwidth, the proposed embodiments are able to provide bandwidth-fair throughput relative to other TCP flows by matching the calculated injection rate to a proportional number of TCP flows operating under the same network conditions. Prior art has shown that an equation-based rate control can be used to match a UDP transport's injection rate to a TCP equivalent rate under similar operating conditions and achieve TCP-bandwidth fairness, but at the expense of stability, throughput and bandwidth utilization. The proposed system accurately determines when there is no available bandwidth and achieves TCP fairness, while maintaining stable, high throughput and full bandwidth utilization when there is available bandwidth.

It has been shown in prior art that the congestion window/sending rate x(t) of all TCP implementations evolves according to the equation:

$$x(t+1) - x(t) = ki(t)(1 - pi(t)/ui(t)) \qquad (\text{Eq. 1})$$

Where $$ki(t) := ki(xi(t), Ti(t)) \text{ and } ui(t) := ui(xi(t), Ti(t))$$

ki(xi, Ti) is a gain function, which determines the dynamic properties such as the stability and responsiveness of the rate but does not affect the equilibrium properties.

ui(xi, Ti) is a marginal utility function that sets the equilibrium properties such as the equilibrium rate allocation and fairness.

pi(t) is the congestion measure, either the loss probability or the queuing delay.

Ti(t) is the round-trip time.

To adapt the sending rate for networks having available bandwidth, some embodiments apply a delay-based approach for TCP as shown in prior art to a reliable UDP transport. This delay-based approach has a marginal utility function:

$$ui = \alpha i(t)/xi(t)$$

where αi(t) is a protocol parameter and xi(t) is the current rate.

and a suggested gain function of:

ki=γ*αi(t) and a congestion measure, pi, the difference between the base round-trip time brtti and current round-trip time srtti.

$$pi = brtti - srtti$$

In some embodiments, brtti is the smallest round-trip time measured during a transfer. For srtti, these embodiments measure the network round-trip delay, not the path round-trip delay, as explained below, and compute a smoothed round-trip time using the same recursive predictive estimator function used to compute the RTO for retransmissions.

To achieve a stable equilibrium rate for a reliable UDP transport, as shown in prior art for TCP, this approach strives to converge the change in sending rate over time to (0). This is accomplished by adjusting the size of the rate and the direction such that the ratio of the congestion measure to the utility function (pi/ui) converges to 1, causing x(t+1)−x(t) in Equation 1 to converge to 0.

Expressing Equation 1 in terms of ui and ki with a γ=½ and simplifying terms, the general equation for rate update is:

$$Rate_{i+1} = \frac{1}{2} * (Rate_i * BaseAvg_{i+1} + Rate_i + \alpha) \quad (Eq. 2)$$

Where:

$$\alpha = 2 * 10^{-5} * TargetRate * \text{block\_size}[bits]$$

$$BaseAvg_{i+1} = 1, \text{ if } brtt_{i+1} < 5 \text{ AND } srtt_{i+1} < 20$$
$$= brtt_{i+1}/srtt_{i+1}, \text{ otherwise}$$

BaseAvg is forced to 1 when brtt and srtt are small, to handle the cases where bat is so small that is of the same order with the precision of the RTT measurement.

In some embodiments, α is the adaptation factor of a linear function of the target rate for convergence over a wide range of bandwidths and tunable aggressiveness. As shown in prior art, the α factor is an expression of the number of packets that must to be buffered in the queues of the transfer path for a source sending at rate xi to reach equilibrium, and represents the "aggressiveness" of the rate control algorithm. Flows with the same value of α will share bandwidth fairly, while flows with a higher value of a will take proportionally more bandwidth.

In these embodiments, unlike prior art, α is adjusted as a linear function of the target rate to allow for convergence to a stable target rate for all practical network bandwidths (ranging form 100 Kbps to 1 Gbps).

Just as accurately estimating the path round-trip time is useful in determining an efficient retransmission timeout (RTO), an accurate measurement of the round-trip time is useful to accurately calculate queuing delay. Queuing delay applies only to the network portion of the transfer path, so various embodiments measure a second round-trip time value, the network RTT, which does not include the processing time at the end hosts. Using the same recursive estimator function used to compute the RTO for retransmission, these embodiments compute a smoothed weighted average of the network WIT and use this value to compute a ratio of the current network RTT to the base RTT used in the rate update function (Equation 2).

To measure the network delay some embodiments use a method similar to measuring the path round-trip time for the RTO. In these embodiments, the receiver generates an accurate "clock tick", using the best clock mechanism offered by each operating system. The receiver generates this tick immediately before sending a retransmission request and embeds it in the retransmission request. If no retransmission requests need to be sent (e.g. when there is no loss on the forward channel), the receiver generates an "empty" retransmission that is sent at a minimum frequency, such as once per 10 ms. The clock tick is embedded in the retransmission request PDU and travels over the network from the receiver to the sender. The sender does an accurate time calculation of the time used to process the retransmission request and adds this time to the clock tick received in the retransmission request PDU, effectively subtracting the processing time. It then embeds the clock tick in a data PDU and sends it to the receiver. Upon reception of a data PDU containing a clock tick, the receiver determines the network delay by subtracting the received clock tick from the current clock. This method is accurate because it uses the highest precision clock mechanisms available from the operating system, and accounts for the time the sender processes the request.

Some embodiments also include the capability of sharing bandwidth fairly, or in a proportional aggressiveness, with any TCP implementation in the presence of network congestion, on networks with no available bandwidth. These embodiments share bandwidth equally or in a configurable proportion with any TCP-compatible implementation (i.e. any protocol that evolves according to Equation 1 previously introduced) by calculating the steady-state rate of one TCP flow under the measured network conditions (for example, as a function of network delay and or packet loss). These embodiments use queuing delay as a signal that no bandwidth is available and do not sacrifice full bandwidth utilization on links that have available bandwidth, while ensuring configurable fairness on links that currently have no available bandwidth.

As shown in prior art, using the fact that the sending rate of all TCP implementations evolve according to equation (1) (as described above):

$$x(t+1) - x(t) = ki(t)(1 - pi(t)/ui(t)) \quad (Eq. 1)$$

An expression for the equilibrium rate for any loss or delay based TCP implementation can be found by setting pi(t)/ui(t)=1.

The proposed embodiment uses a delay-based congestion algorithm as shown in equation 3.

$$Xi = \alpha ri/srtti - brtti \quad (Eq. 3)$$

As shown in prior art, the equilibrium rate for the most commonly deployed TCP implementation (TCP Reno) is expressed in equation 4:

$$Xi = \alpha ri/rtti * p^{0.5} \quad (Eq. 4)$$

Where αri is a TCP Reno protocol parameter that depends on a constant and the MTU size.

In some of the proposed embodiments the two equilibrium rates are equated to derive the adaptation parameter α in terms of queuing delay and the equilibrium rate function for the particular TCP in equation 5.

$$\alpha i = (srtti - brtti) * \alpha ri / (rtti * pi^{0.5}) \quad \text{(Eq. 5)}$$

The derived α is then used to calculate a bandwidth-fair rate (using Equation 3), meaning equal to the TCP rate for the currently measured network parameters (e.g. round-trip time and/or packet loss). A method for accurately measuring round-trip time has already been described. The packet loss rate may be measured in numerous ways, such as using an estimated weighted moving average.

Note that the same method can be applied to match the equilibrium rate of TCP's with different response functions as these TCPs are deployed, e.g. High-speed TCP or Scalable TCP:

$$\text{High-speed TCP:} Xi = \alpha hi / Ti * pi^{0.84}$$

$$\text{Scalable TCP:} Xi = \alpha si / Ti * pi$$

The rate control functionality according to some embodiments of the present subject matter includes two major components. Finding the α factor to yield a rate equal to the TCP rate in terms of queuing delay, packet loss and round-trip time for bandwidth fairness when there is "congestion" (no available bandwidth); and accurately determining when there is congestion, using queuing delay, to signal entry into the TCP-friendly state. These embodiments determine the congestion conditions under which to use a TCP-friendly rate by using a two state machine that operates in an adaptive "x-mode" according to the subject matter (for utilization of unused bandwidth when bandwidth is available) and a TCP mode (for fairness when there is no bandwidth available).

These embodiments enter the TCP friendly mode only when there is congestion, and do not leave the TCP friendly mode until it is known that congestion has ended. These embodiments use a hysteresis model to determine when to switch modes. If the round-trip time is increasing and the queuing delay is sufficiently greater than the base rtt to be meaningful, the TCP mode is entered. Once in TCP mode, such a system stays in TCP mode until the rtt is decreasing and the queuing delay is sufficiently close to the base rtt to indicate that the queuing has really dropped.

The specific parameters used in the some embodiments were determined experimentally:

---
Let drtt = srtt − brtt − 10.
- Initial state is x-mode
- In x-mode: If srtt increased from last sample AND
  drtt > 0.2 * brtt, switch to TCP mode
    Else stay in x-mode
- In TCP mode: If srtt decreased from last sample
  AND drtt < 0.5 * brtt, switch to x-mode
    Else stay in TCP mode
---

This method provides very good results for concurrent flow scenarios over different network conditions.

The parameters of the rate control model provide tunable "control knobs" to applications. Exposing α as a configurable parameter allows for the change of target rate or aggressiveness while a transfer is running.

The application can set its aggressiveness relative to a number (and type) of TCP flows, such as a rate equivalent to one standard TCP flow, or two other standard TCP flows. Also the application can select a specific mode, such as a "trickle" mode, where the flow backs off entirely to a minimum threshold when sharing with TCP but will ramp up to take the entire bandwidth when running alone.

Some embodiments introduce a highly efficient trickle transfer, by allowing a data transfer to utilize the entire bandwidth as long as there is no other network activity, and back itself up to a very low rate when network activity is detected. By running a transfer in adaptive-rate mode and setting the aggressiveness factor very low, the flow will utilize the full available bandwidth when running in no-congestion mode and will back off entirely when entering congestion mode. In conjunction, the transfer application can set a minimum rate threshold for this transfer, to guarantee a delivery time. A user of the trickle application can change the minimum threshold on-the-fly, trading network bandwidth for the time to transfer.

Some embodiments include optional cryptography elements to encrypt and decrypt blocks of data on-the-fly.

At the beginning of a transfer, a secure TCP channel is setup with the remote end-point, using an established method, such as SSH or SSL/TLS. A receiver in such an embodiment generates a random symmetric encryption key given a user-configurable cipher (encryption algorithm) and exchanges it with the sender using the secure channel. In some embodiments, the end-points can decide to change the encryption key periodically and exchange the new keys through the secure channel. The sender encrypts each data block to ensure data confidentiality and adds a Message Authentication Code to ensure the data authenticity. This method is provided as an option in various embodiments, such as an application-level data transfer application. This method provides applications a means to transfer data securely over public, unsecured networks, such as the Internet.

Some embodiments also provide the ability to control and monitor file transfers. These embodiments offer a TCP socket interface for management, such that the manager application can be running on the same or on a different computer than the managed transfer end-point. This interface allows control and monitoring operations such as the ability to start and stop a transfer, modify the transmission rate on the fly, pause and resume a transmission, and change transmission parameters on the fly, such as enable or disable adaptive rate mode, change aggressiveness. The control and monitoring operations also include operations such as the ability to read basic transfer statistics, read transfer statistics necessary for progressive download, and read FASP specific statistics, such as retransmission data structure parameters, disk writing statistics and adaptive rate parameters. This interface is a mechanism for integrating various transport embodiment elements into applications. The interface also allows applications to implement transfer policies such as prioritization and bandwidth utilization management.

Some embodiments provide an application-level reliable UDP protocol to allow applications to change the transfer rate of an ongoing transfer. The transfer manager, using the management interface, controls one of the two end-points involved in a data transfer. Both the sender and receiver, when controlled by the same transfer manager, have a dedicated processing thread allowing exchange of monitoring and control messages with the transfer manager independent of the data processing thread(s). When receiving control commands, such as on-the-fly rate changes, the dedicated management thread of the sender and receiver stores the new values and the main data processing thread queries and picks up the new values periodically.

If the manager controls the receiver, the manager passes it the desired minimum or maximum rate threshold. The receiver uses the new values in computing the target rate required for the adaptive-rate mode, or sets the target rate to the maximum threshold if running in fixed-rate mode. The receiver sends the target rate, whether computed or set, to the sender in periodic statistics messages and the sender obeys it.

If the manager controls the sender, the manager passes it the desired minimum or maximum rate threshold. If running in fixed-rate mode, the sender will use the new rate as its fixed target rate, disregarding the target rate requested by the receiver in statistics messages. If running in adaptive-rate mode, the sender stores the minimum and maximum rates set by the manager, and compares them to the target rate requested by the receiver. If the target rate requested by the receiver is greater than the maximum rate threshold, the sender sets its target rate to the maximum rate threshold. If the target rate requested by the receiver is less than the minimum rate threshold, the sender sets its target rate to the minimum threshold. Else, the sender sets its target rate to the target rate requested by the receiver.

Given the predictable nature of data transfers according to various embodiments of the present subject matter, the user can choose to set the time to transfer, rather than the transfer rate. An application embodiment can allow the user to set the time to transfer or the estimated time of arrival and calculate the target rate required to meet it. The transfer manager can then set the target rate on-the-fly, as described above.

Pausing an ongoing transfer is a particular case of setting the target rate on-the-fly (setting the rate to 0), but it requires both the sender and receiver to fully stop sending or trying to receive data. This feature is useful for unplanned bandwidth prioritization. To pause, the transfer manager sets the target rate, or the maximum rate threshold in adaptive-rate mode, to 0. The sender learns about the new rate value from the transfer manager or from the receiver through the statistics messages. Once the sender detects this special case, the sender stops sending data and waits for the transfer manager to set the target rate to a value larger than 0. If the receiver is controlled by the transfer manager, the receiver learns about the new rate setting of 0 directly. If the sender is controlled by the transfer manager, it sends a control message to the receiver to inform it about entering a "paused" state. In some embodiments, it is important that the receiver be aware of the "paused" state to avoid triggering a data reception timeout.

The transfer manager, through the management interface, passes the rate control mode setting (fixed rate, adaptive rate and bandwidth aggressiveness) to the sender or receiver. If the receiver is controlled by the transfer manager, the receiver stores and implements the new rate control mode. The receiver sends the fixed or calculated target rate to the sender through statistics or control messages. If the sender is controlled by the transfer manager, the sender stores the new setting and sends it to the receiver through a control message. In one embodiment, the bandwidth aggressiveness can be expressed in terms of a multiple of the standard TCP aggressiveness. Some embodiments include the capability to support a continuous sliding scale of aggressiveness relative to standard TCP and to other TCPs. This can be exposed to the end-user through the management interface as a flow type compatibility with a continuous index to "dial" the aggressiveness value relative to that flow type.

In terms of OSI protocol stack, some embodiments of the present subject matter provide an integrated data transport layer, session layer, and service layer protocol.

Various embodiments include integration within an operating system file transfer framework such as SSH and SCP. SSH provides a user authentication and key exchange framework. Some embodiments use this framework to establish encryption keys, if running in an optional secure mode. SCP provides a de-facto user interface for remote file copy. Some embodiments include integration with SCP as an alternative, high-performance data path to TCP.

Some embodiments store transfer meta data permitting the resumability of a file transfer without or with minimum waste of data that has already been transferred. The transfer can be resumed from any sender storing the same file, not necessarily from the same sender. This allows deployment of redundant systems, where applications can resume after a failure of the sender system, or a connection thereto, when a backup sender, or connection route, is available. This resumability service offers several layers of integrity checking, balancing integrity guarantee and verification time (the verification time counts again total end-to-end transfer speed).

The target rate based nature of the block based transfer systems, methods, and software described herein, along with the equation based rate control, provide for embodiments that include transfer policies. Some such transfer policies relate to bandwidth allocation, prioritization, and manual control of file transfers.

a) Bandwidth Allocation Policy

Given an organization with multiple locations and the capacity of the network links between these locations, an administrator or bandwidth management application can determine the allocation of network capacity between different file transfer applications. The maximum transfer rates for each flow can be passed to the file transfer applications and enforced. The transfer rate caps can be passed before the file transfers are initiated, or while they are in progress.

For time driven bandwidth allocation, when file transfers have to meet a certain transfer time, one embodiment allows the setting of a minimum transfer rate. The flow will behave fairly in the presence of congestion, but will not slow down beyond the minimum transfer rate. This guarantees a minimum delivery time, at the cost of unfairly forcing all other traffic to compete for the remaining bandwidth.

b) Prioritization Policy

Some embodiments can associate a priority level to rate control aggressiveness factors. Thus, high priority traffic will be dynamically allotted more bandwidth. In an extreme case of prioritization, the low priority traffic can be configured to stop completely when competing with high priority traffic. This also allows trickle transfers having no impact on other traffic, by setting the trickle traffic priority to the lowest level, causing it to stop in the presence of any other traffic.

c) Manual Control of File Transfer Policy

The management interface provided with some embodiments allows users or administrators to change transfer parameters on the fly. This includes pausing transfers to allow other transfers to run faster, as well as slowing down or speeding up ongoing transfers.

Some embodiments expose the following parameters to the application: target rate (or maximum rate for adaptive rate control), minimum rate (for adaptive rate control), and adaptation factor. These parameters can be set before the transfer is initiated or modified while the transfer is in progress. Based on these parameters, applications can intelligently control file transfers to achieve:

File transfer at a fixed rate by specifying fixed rate control and supplying a target rate.

File transfer at link capacity, but adapting fairly in presence of competing traffic by specifying adaptive rate control and supplying a maximum rate higher or equal than the link capacity.

File transfer at a given rate, but adapting down to a minimum rate in presence of congestion by specifying adaptive rate control and supplying a minimum rate. The flow will adapt to share the link with competing traffic, but its rate will not be lower than the minimum specified, thus guaranteeing time of delivery.

File transfer at link capacity, but not impacting any competing traffic by specifying adaptive rate control and supplying the minimum value for the adaptation factor. The flow will run at link capacity but will stop in presence of competing traffic, thus not impacting normal network activity at all. This can be used for efficient trickle transfers.

By allowing applications to change the transfer rate while a transfer is in progress, applications can pause and resume transfers by setting the target rate to zero, and then back to a non-zero value.

Some embodiments also provide an intelligent, block based, caching service. This allows these embodiments to determine if segments of a file have already been transferred to the receiver system and reuse the cached data instead of transferring it over the network. This caching service offers several layers of integrity checking. The type of integrity checking may be specified by the application or automatically determined by FASP using an optimization function. The optimization function considers the cache integrity verification time against network capacity and transfer queue. If the transfer is faster than the local integrity verification, the caching service chooses to transfer the data again. Otherwise, the data cached locally is reused.

Some further embodiments provide all the necessary monitoring and control services to allow applications to implement dual-sided pipelined data transfer, also referred to as a progressive download. A dual-sided data transfer includes one transfer end-point receiving data and at the same time sending the same data to a third transfer end-point or consuming the data. Examples of dual-sided pipelined transfer include an application downloading a media file and in the same time feeding it to a media player, or a caching application downloading a file on behalf of a user and storing the file on cache while delivering it to the user in the same time.

One such embodiment includes a method to achieve the pipelined data transfer by starting the data transfer from A to B at the desired rate and exposing, on B, the effective reception rate, loss rate, and amount of contiguous data received, starting at the beginning of the file. The method further includes determining a time to start a transfer from B to C based on the exposed data on B and on the desired transfer rate from B to C. The method also includes exposing on B, the effective rate of the transfer from B to C and the amount of data sent. Based on this information, the method can decide if the pipeline functions properly. In case the transfer B to C goes ahead of the transfer A to B, the method can slow down or even pause the transfer B to C. Further, the method includes exposing the smallest block number that the transfer from B to C is allowed to request. This allows the method on B to discard the data up to that point, which is useful when storage is limited.

Some embodiments include identifying and transferring files using references. A transmission endpoint can download or upload files or directories based on specific references. The references, in various embodiments, include an identification of the remote file or directory, transport parameters such as transfer rate, adaptive rate control, and encryption.

One example format of a reference is:
 fasp://<sever-name>/<path>[?<option>&<option>...]

<server-name> is the remote machine's name (FQDN) or IP address.

<path> can point to a directory or a file.

One or more of the following options are available for references in various embodiments:

| | |
|---|---|
| xfer=up\|down | Up represents an upload in which case the path represents a target directory |
| auth=yes\|no | If set to yes, the transfer requires user authentication |
| enc=yes\|no\|any | If set to yes, it forces the download to be encrypted, and if set to no, it forces it to by unencrypted. If set to any or not present, the user may choose to encrypt or not. |
| maxrate=<val> | Sets the maximum allowed rate to <val> Kbps. The user may choose a transfer rate up to this value. |
| defrate=<val> | Sets the default transfer rate to <val> Kbps. The user may choose another rate up to the maximum allowed. |
| adapt=yes\|no | If set to yes, uses adaptive rate control |
| port=<val> | Sets a UDP port to <val>. |
| sign=<val> | Signature of reference string, as a security measure for insuring integrity. |

By providing the transfer by reference service, FASP can be easily integrated in applications such as web download or upload, email attachment replacement with references for FASP download, asset management system check-in and check-out. Some example embodiments of the subject matter utilize UDP to carry the block data payload. However the same objectives can be accomplished utilizing virtually any transport or network layer mechanism. The alternative transports and network layers, for example, can include a user defined transport protocol over IP or a modified TCP stack on the endpoints. The TCP stacks on the endpoints can be modified to act like UDP, e.g., no flow control or retransmission. The blocks can be sent as TCP packets over the network which can offer the ability to establish firewall settings, thus avoiding specific firewall and intrusion detection settings for UDP. Other alternative transports include non-IP networks, offering services similar to IP: "best effort" connectionless routing and delivery of packets between two or more endpoints involved in a data transfer operation. Such networks include satellite, packet radio, point-to-point or broadcast wireless networks, and ATM.

The architecture of some embodiments is two-tiered. The first tier in such embodiments provides a protocol, offering a block-based file transport service to applications. The second tier is a minimal file transfer application built on top of the protocol.

However, variations of to this architecture can include implementing the systems and methods as part of an operating system, as a driver, kernel module or simply part of a monolithic operating system. Other variations include implementing the subject matter in a monolithic data transfer application (i.e., a single tiered approach).

Other embodiments include using an interception proxy, transparent or not, to intercept existing TCP traffic and transport it over the network according to the various elements described herein to a proxy at the remote end, which passes the data to the remote end of the TCP application using TCP. This interception proxy can be a software piece operable on the endpoint machines, a software piece operating on file or application server machines, or a hardware device attached to the network. Yet further embodiments include the subject matter within a network file system. Another embodiment includes a specialized application gateway for wireless or satellite networks for efficient bulk transport.

Some embodiments include methods and algorithms to achieve reliability, performance, security, and manageability by tuning certain protocol parameters. The values of these parameters are set in accordance with the network and operating system environment. The reliability, performance, security, and manageability is accomplished by manipulating these parameters or the way they are calculated. These parameters include:

Block size
Retransmission timeout parameters $\gamma$ and $\eta$
File cache size
File cache low and high watermark
File cache retransmission average
Rate control FASP and TCP compatibility mode parameter $\alpha$
Rate control base average step function parameters
Rate control parameter C
Rate control parameters factors for state switch between FASP and TCP mode It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

It will be readily understood to those skilled in the art that various other changes in the details, material, and arrangements of the parts and method stages which have been described and illustrated in order to explain the nature of this inventive subject matter may be made without departing from the scope of the present subject matter as expressed in the attached claims and their legal equivalents.

What is claimed is:

1. A method for providing transfer of data over a network between a sender and a receiver, comprising:
    at the sender, transmitting blocks of data identified by sequence numbers at a programmable injection rate as determined by an injection rate input;
    at the receiver, receiving the blocks of data transmitted by the sender and detecting blocks that have been lost in transmission based on the sequence numbers received;
    at the receiver, transmitting a retransmission request to the sender when a missing data block is detected and scheduling repeated transmission of the retransmission request based upon a predicted path round-trip time until the missing block is received;
    at the receiver, throttling the transmission of retransmission requests commensurate with the injection rate.

2. The method of claim 1 further comprising calculating the predicted path round-trip time through a predictive estimation of the time required to send a retransmission request from the receiver to the sender, retrieve a corresponding data block from a data source at the sender, and transmit the data block to the receiver.

3. The data transfer system of claim 2 further comprising performing a Van Jacobson prediction of the predicted round-trip time.

4. The method of claim 1 further comprising at the receiver storing identification numbers of blocks to be retransmitted in an indexed array, where an index for each such block travels with a request for retransmission to the sender and back with the data block itself.

5. The method of claim 1 further comprising at the sender storing a plurality of identification numbers for blocks needing retransmission in a modified Red Black Tree with substantially constant-time retrieval of block id's sorted by number.

6. The method of claim 1 further comprising using a high watermark calculated as a logarithmic function of the running average of the number of lost blocks in a disk write cache process to maximize the cache hit rate.

7. The method of claim 1 further comprising:
    detecting unused bandwidth currently available of the network between the sender and the receiver, the detection independent of packet loss;
    if unused bandwidth is currently available, entering a bandwidth utilization mode that generates a target injection rate substantially equal to the currently unused bandwidth independent of packet loss, and for all usable network bandwidths;
    if unused bandwidth is not currently available, entering a bandwidth sharing mode that generates a target injection rate that is a configurable proportion of the bandwidth consumed by other ongoing flows;
    transmitting data substantially at the target injection rate; and
    repeating the detection to update the target injection rate.

8. The method of claim 7 wherein the target injection rate is equal to a steady-state rate of a target flow type that is a function of measurable end-to-end parameters of a network path between the sender and the receiver.

9. The method of claim 8 wherein the measurable end-to-end parameters include one or more of queuing delay, round-trip time, and packet loss.

10. The method of claim 7 wherein detecting unused bandwidth includes using a hysteresis model that defaults to the bandwidth utilization mode and measures an absolute value and a direction of change in network queuing delay to determine whether to enter the bandwidth sharing mode.

11. A data transfer system for providing transfer of data over a network, comprising:
    a sender configured to transmit blocks of data identified by sequence numbers at a programmable injection rate as determined by an injection rate input;
    a receiver configured to receive the blocks of data transmitted by the sender and to detect blocks that have been lost in transmission based on the sequence numbers received;
    wherein the receiver is configured to transmit a retransmission request to the sender when a missing data block is detected and configured to schedule repeated transmission of the retransmission request based upon a predicted path round-trip time until the missing block is received;
    wherein the receiver is configured to throttle the transmission of retransmission requests commensurate with the injection rate.

12. The system of claim 11 wherein the receiver is configured to calculate the predicted path round-trip time through a predictive estimation of the time required to send a retransmission request from the receiver to the sender, retrieve a corresponding data block from a data source at the sender, and transmit the data block to the receiver.

13. The data transfer system of claim 12 wherein the receiver is configured to perform a Van Jacobson prediction of the predicted round-trip time.

14. The system of claim 11 wherein the receiver is configured to store identification numbers of blocks to be retransmitted in an indexed array, where an index for each such block travels with a request for retransmission to the sender and back with the data block itself.

15. The system of claim 11 wherein the sender is configured to store a plurality of identification numbers for blocks needing retransmission in a modified Red Black Tree with substantially constant-time retrieval of block id's sorted by number.

16. The system of claim 11 wherein the sender incorporates a disk write cache mechanism to minimize random access to a disk, the mechanism using a high watermark calculated as a running average of the size of a retransmission table.

17. The system of claim 11 wherein the sender is further configured to:
- detect unused bandwidth currently available of the network between the sender and the receiver, the detection independent of packet loss;
- if unused bandwidth is currently available, enter a bandwidth utilization mode that generates a target injection rate substantially equal to the currently unused bandwidth independent of packet loss, and for all usable network bandwidths;
- if unused bandwidth is not currently available, enter a bandwidth sharing mode that generates a target injection rate that is a configurable proportion of the bandwidth consumed by other ongoing flows;
- transmit data substantially at the target injection rate; and
- repeat the detection to update the target injection rate.

18. The system of claim 17 wherein the target injection rate is equal to a steady-state rate of a target flow type that is a function of measurable end-to-end parameters of a network path between the sender and the receiver.

19. The system of claim 18 wherein the measurable end-to-end parameters include one or more of queuing delay, round-trip time, and packet loss.

20. The system of claim 17 wherein detecting unused bandwidth includes using a hysteresis model that defaults to the bandwidth utilization mode and measures an absolute value and a direction of change in network queuing delay to determine whether to enter the bandwidth sharing mode.

* * * * *

UNITED STATES PATENT AND TRADEMARK OFFICE
CERTIFICATE OF CORRECTION

PATENT NO.        : 8,583,977 B2                           Page 1 of 1
APPLICATION NO.   : 13/540404
DATED             : November 12, 2013
INVENTOR(S)       : Michelle Christine Munson et al.

It is certified that error appears in the above-identified patent and that said Letters Patent is hereby corrected as shown below:

In the Specification

Please replace the paragraph at line 6 to line 8 of column 1, with the following paragraph:
--This application is a continuation of and claims the benefit of priority of U.S. Application Serial No. 11/768,336, filed June 26, 2007, now U.S. Patent No. 8,214,707, issued July 3, 2012, which is a continuation of and claims the benefit of priority of U.S. Application Serial No. 11/317,663, filed December 23, 2005, now U.S. Patent No. 8,085,781, issued December 27, 2011, which claims the benefit of priority under 35 U.S.C. §119(e) of U.S. Provisional Application Serial No. 60/649,198, filed February 1, 2005; U.S. Provisional Application Serial No. 60/649,197, filed February 1, 2005, and U.S. Provisional Application Serial No. 60/638,806, filed December 24, 2004, each of which is incorporated by reference herein in its entirety.--

Signed and Sealed this
Seventeenth Day of March, 2015

Michelle K. Lee
*Director of the United States Patent and Trademark Office*